(12) United States Patent
Yasuoka et al.

(10) Patent No.: US 10,715,948 B2
(45) Date of Patent: Jul. 14, 2020

(54) INFORMATION PROCESSING APPARATUS AND NON-TRANSITORY COMPUTER READABLE MEDIUM STORAGE PROGRAM

(71) Applicant: FUJI XEROX CO., LTD., Tokyo (JP)

(72) Inventors: Daisuke Yasuoka, Kanagawa (JP); Kiichiro Arikawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/946,231

(22) Filed: Apr. 5, 2018

(65) Prior Publication Data

US 2019/0069130 A1    Feb. 28, 2019

(30) Foreign Application Priority Data

Aug. 25, 2017  (JP) ................. 2017-162700

(51) Int. Cl.
*H04W 4/021* (2018.01)
*H04M 1/725* (2006.01)
*G06F 3/12* (2006.01)

(52) U.S. Cl.
CPC ......... *H04W 4/021* (2013.01); *H04M 1/7253* (2013.01); *G06F 3/1204* (2013.01);
(Continued)

(58) Field of Classification Search
CPC ...... G06F 3/0482; G06F 3/017; G06F 3/0486; G06F 17/30011; G06F 17/212; G06F 17/2247; G06F 17/2705; G06F 17/30321; G06F 17/30339; G06F 3/04817; G06F 3/01; G06F 3/012; G06F 3/0304; G06F 3/0425; G06F 3/04815; G06F 3/04845; G06F 3/1446; G06F 17/30528; G06F 1/1639; G06F 3/04812; G06F 3/04842; G06F 3/04886; G06F 3/1206; G06F 3/1232; G06F 3/1247; G06F 3/1292; G06F 11/3089; G06F 13/385; G06F 17/30383; G06F 17/30516; G06F 19/00; G06F 19/321; G06F 3/00; G06F 3/005; G06F 3/0202; G06F 3/0338; G06F 3/0346; G06F 3/038; G06F 3/0414; G06F 3/0421; G06F 3/0423; G06F 3/044; G06F 3/0481; G06F 3/0483; G06F 3/0488; G06F 3/1204; G06F 3/1245; G06F 3/1265; G06F 3/1268; G06F 3/1286;
(Continued)

(56) References Cited

U.S. PATENT DOCUMENTS 6,687,018 B1 *  2/2004  Leong ............... G06F 3/1205
                                              358/1.1
6,778,289 B1 *  8/2004  Iwata ............... G06F 16/951
                                              358/1.15
(Continued)

FOREIGN PATENT DOCUMENTS

JP    2002-344668 A    11/2002
JP    2016-100828 A     5/2016

*Primary Examiner* — Daniel Lai
(74) *Attorney, Agent, or Firm* — Sughrue Mion, PLLC

(57) ABSTRACT

An information processing apparatus includes an acquirer that acquires information indicating a request from a user, and a controller that causes, in response to the request, a provider to provide first information that does not depend on a device or second information that depends on the device.

16 Claims, 14 Drawing Sheets

(52) U.S. Cl.
CPC .......... *G06F 3/1253* (2013.01); *G06F 3/1292* (2013.01); *H04M 1/72572* (2013.01)

(58) Field of Classification Search
CPC ...... G06F 3/1293; G06F 3/167; G06F 9/4498; G06F 3/1253; H04N 9/3179; H04N 5/74; H04N 5/23238; H04N 5/23293; H04N 2201/0094; H04N 13/221; H04N 13/279; H04N 13/363; H04N 1/0001; H04N 1/00251; H04N 1/00344; H04N 1/00381; H04N 1/00408; H04N 1/00419; H04N 1/00474; H04N 1/00503; H04N 2005/4408; H04N 2005/443; H04N 21/2662; H04N 2201/0075; H04N 2201/0082; H04N 5/247; H04N 9/31; G06T 2200/24; H04W 4/02; H04W 4/021; H04W 4/18; H04W 64/003; H04W 76/28; H04W 92/08; G06Q 10/06; G06Q 10/10; G06Q 30/0241; G06Q 50/18; H04L 67/22; H04L 41/22; H04L 67/306; H04M 1/72572
See application file for complete search history.

(56) References Cited

U.S. PATENT DOCUMENTS

| | | | | |
|---|---|---|---|---|
| 7,242,491 | B2 * | 7/2007 | Nakayasu | G06F 3/1204 358/1.15 |
| 7,266,546 | B2 * | 9/2007 | Son | G06F 16/955 |
| 7,372,589 | B2 * | 5/2008 | Ohara | G06F 3/1205 358/1.15 |
| 7,443,523 | B2 * | 10/2008 | Leone, III | G06F 3/1205 358/1.13 |
| 7,586,635 | B2 * | 9/2009 | Maeda | H04N 1/00204 358/1.1 |
| 7,599,077 | B2 * | 10/2009 | Hotokeishi | B41J 29/393 358/1.13 |
| 8,330,980 | B2 * | 12/2012 | Sorrentino | G06F 3/1203 358/1.13 |
| 8,405,872 | B2 * | 3/2013 | Sekhon | G06F 3/1208 358/1.18 |
| 8,448,078 | B2 * | 5/2013 | Stewart | G06F 3/1208 715/734 |
| 8,564,794 | B2 * | 10/2013 | Lemoine | B41J 3/60 271/225 |
| 8,705,064 | B2 * | 4/2014 | Ellis | G06F 21/608 358/1.1 |
| 8,744,838 | B2 * | 6/2014 | Roulland | G06F 11/0733 704/9 |
| 8,823,987 | B2 * | 9/2014 | Sponable | G03G 15/5016 358/1.1 |
| 8,836,995 | B2 * | 9/2014 | Salgado | G06F 3/1205 358/1.18 |
| 8,886,556 | B2 * | 11/2014 | Gnanasambandam | G06Q 30/0251 705/14.45 |
| 8,891,125 | B2 * | 11/2014 | Sprague | G06F 3/1254 358/1.11 |
| 9,123,047 | B2 * | 9/2015 | Wilkie | G06Q 20/342 |
| 9,207,884 | B1 * | 12/2015 | Baratharajan | G06F 3/1204 |
| 9,326,015 | B2 * | 4/2016 | Hirano | H04N 21/2541 |
| 9,578,203 | B2 * | 2/2017 | Mamandoor AnanthaNarayanan | H04N 1/00045 |
| 9,940,081 | B2 * | 4/2018 | Yamada | G06F 3/1213 |
| 9,940,563 | B2 * | 4/2018 | Kaye | G06K 15/4095 |
| 10,089,047 | B2 * | 10/2018 | Matsui | G06F 3/1255 |
| 10,169,340 | B2 * | 1/2019 | Ogata | G05B 19/0423 |
| 10,248,638 | B2 * | 4/2019 | Tokie | G06F 17/243 |
| 2001/0052995 | A1 * | 12/2001 | Idehara | G06F 3/1204 358/1.15 |
| 2002/0115451 | A1 * | 8/2002 | Taniguchi | H04N 1/00127 455/456.5 |
| 2004/0004735 | A1 * | 1/2004 | Oakeson | G06F 3/1212 358/1.15 |
| 2005/0097608 | A1 * | 5/2005 | Penke | G06F 21/35 725/60 |
| 2007/0050242 | A1 * | 3/2007 | Kralik | G06Q 30/02 705/14.1 |
| 2008/0291471 | A1 * | 11/2008 | Uchida | G06Q 30/02 358/1.6 |
| 2011/0191183 | A1 * | 8/2011 | Jones | G06Q 30/0257 705/14.55 |
| 2012/0203618 | A1 * | 8/2012 | Roever | G06Q 30/02 705/14.35 |
| 2013/0085968 | A1 * | 4/2013 | Schultz | G06F 21/32 705/400 |
| 2016/0094736 | A1 * | 3/2016 | Kanbayashi | H04N 1/00392 358/1.15 |
| 2017/0238144 | A1 * | 8/2017 | Chatani | G06F 13/00 455/456.3 |
| 2019/0026373 | A1 * | 1/2019 | Wang | G06F 16/9535 |

\* cited by examiner

FIG. 9

| | | TYPE OF DEVICE | | |
|---|---|---|---|---|
| | | MULTIFUNCTION PERIPHERAL | PROJECTOR | DEVICES IN GENERAL |
| TYPE OF PROVIDING METHOD | VISUAL | SWITCH AMONG:<br>·CONVERSATION MODE<br>·INFORMATION PROVIDING MODE<br>·OPERATING MODE | ·RECOMMEND DOCUMENTS THAT HAVE EVER BEEN PROJECTED ON PROJECTOR DURING INFORMATION PROVIDING MODE | ·DISPLAY OPERATION PART INFORMATION AT BOTTOM IN OPERATING MODE WHEN BOTTOM-TO-TOP LINE OF SIGHT IS DETECTED |
| | AUDIO | ·PROVIDE INFORMATION WHEN PERSON IS DETECTED IN AREA 40 | ·DO NOT PROVIDE DEPENDENT INFORMATION IN DEFAULT SETTINGS<br>·ENABLE PROJECTOR TO PROJECT DETAILED INFORMATION DURING INFORMATION PROVIDING MODE | ·TURN UP VOLUME WHEN PERSON IS LOCATED AT DISTANCE<br>·INCREASE SENSITIVITY OF AUDIO INPUT WHEN PERSON IS LOCATED AT DISTANCE<br>·TURN DOWN VOLUME WHILE PERSON IS STAYING WHEN GESTURE OF PUTTING FINGER TO LIPS IS DETECTED |
| | GENERAL | ·ENABLE PRINT OPERATION DURING INFORMATION PROVIDING MODE | ·PROVIDE ADDITIONAL INFORMATION IN RESPONSE TO INSTRUCTION FROM PERSON WHEN PLURAL PERSONS ARE DETECTED IN AREA 40 | |

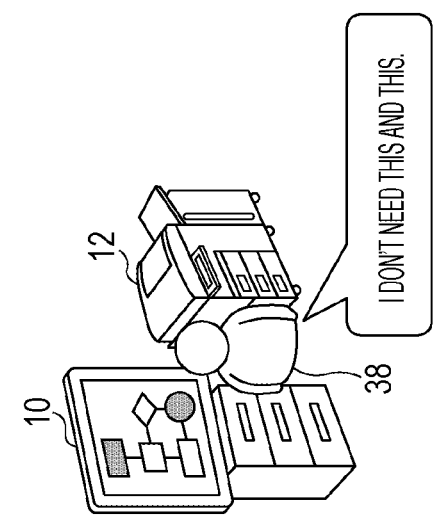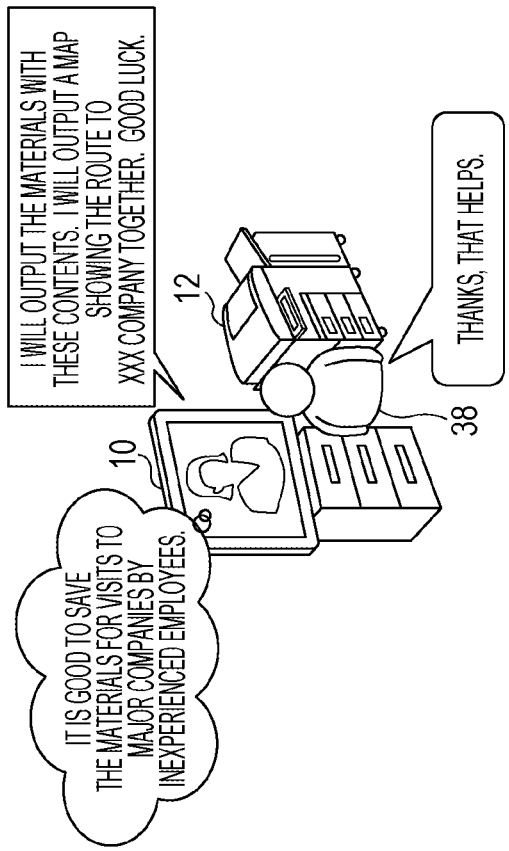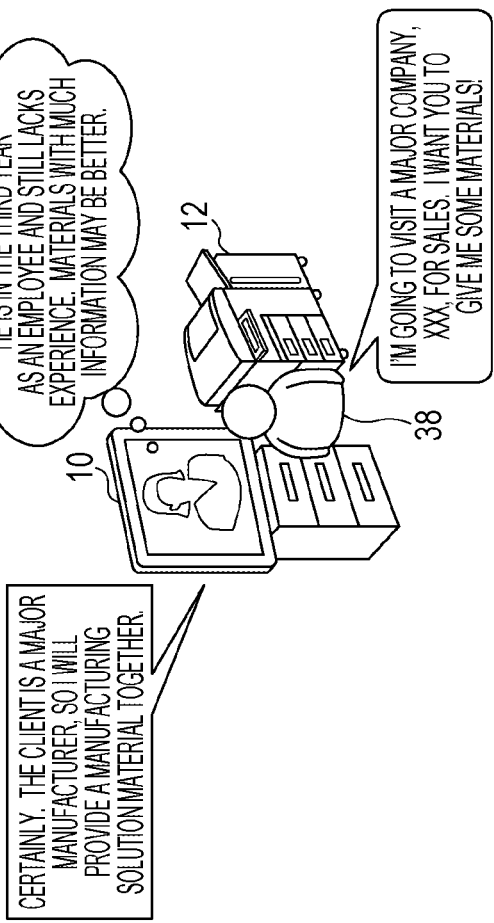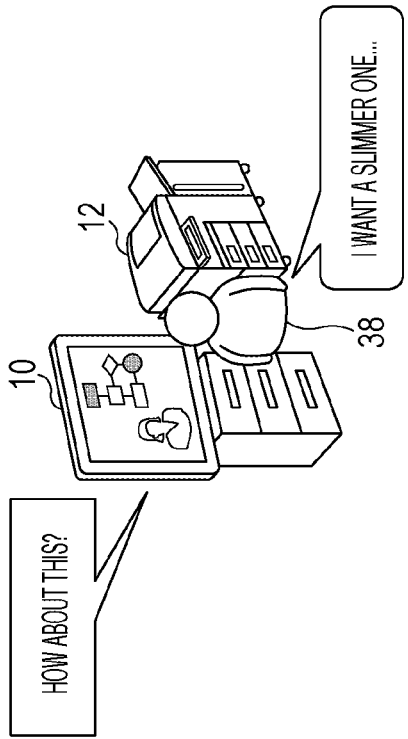

INFORMATION PROCESSING APPARATUS AND NON-TRANSITORY COMPUTER READABLE MEDIUM STORAGE PROGRAM

CROSS-REFERENCE TO RELATED APPLICATIONS

This application is based on and claims priority under 35 U.S.C. 119 from Japanese Patent Application No. 2017-162700 filed Aug. 25, 2017.

BACKGROUND

Technical Field

The present invention relates to an information processing apparatus and a non-transitory computer readable medium storing a program.

SUMMARY

According to an aspect of the invention, there is provided an information processing apparatus including an acquirer that acquires information indicating a request from a user, and a controller that causes, in response to the request, a provider to provide first information that does not depend on a device or second information that depends on the device.

BRIEF DESCRIPTION OF THE DRAWINGS

An exemplary embodiment of the present invention will be described in detail based on the following figures, wherein:

FIG. 9 illustrates correspondences among a type of an information providing method, a type of the device, and details of an operation;

FIGS. 16A to 16D illustrate Specific Example 4; and

DETAILED DESCRIPTION

Figure 1:
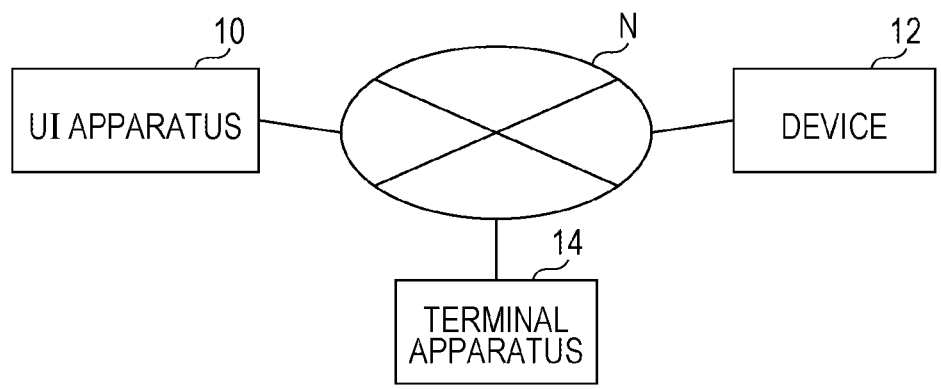
FIG. 1 is a block diagram illustrating a device system according to an exemplary embodiment of the present invention.

A device system serving as an information processing system according to an exemplary embodiment of the present invention is described with reference to FIG. 1. FIG. 1 illustrates an example of the device system according to this exemplary embodiment.

The device system according to this exemplary embodiment includes a UI apparatus 10 serving as an information processing apparatus, a device 12, and a terminal apparatus 14. For example, the UI apparatus 10, the device 12, and the terminal apparatus 14 have functions of communicating with each other via a communication path N such as a network. The UI apparatus 10, the device 12, and the terminal apparatus 14 may communicate with other apparatuses via different communication paths without using the communication path N. In the example illustrated in FIG. 1, a single device 12 is included in the device system but plural devices 12 may be included in the device system. The plural devices 12 may have the same function or different functions. A single terminal apparatus 14 is included in the device system but plural terminal apparatuses 14 may be included in the device system. Depending on a situation in which the device system according to this exemplary embodiment is applied, the terminal apparatus 14 may be omitted from the device system.

The UI apparatus 10 is a user interface apparatus and provides, in response to a user's request, information that does not depend on the device 12 (independent information) or information that depends on the device 12 (dependent information). The UI apparatus 10 has a function of transmitting and receiving data to and from other apparatuses. For example, the UI apparatus 10 may acquire information from the device 12 and may transmit information to the device 12.

The independent information is information that is not unique to the device 12 (information that is not related to the device 12). The independent information may further be information that is not unique to the user (information that is not related to the user). That is, the independent information may be information that does not depend on the device 12 and is not unique to the user. The independent information corresponds to an example of first information.

The dependent information is information unique to the device 12 (information related to the device 12). The dependent information may further be information unique to the user (information related to the user). That is, the dependent information may be information that depends on the device 12 and is unique to the user. More specifically, the dependent information is information unique to the user about the device 12. The dependent information corresponds to an example of second information.

The device 12 is a device having a function, such as an image forming device having an image forming function, a personal computer (PC), a projector, a vending machine, a coffee machine, a telephone, a display device such as a liquid crystal display, a refrigerator, a microwave oven, an air purifier, a cleaner, or a game console. The category of the device 12 may include devices in general. The device 12 has a function of transmitting and receiving data to and from other apparatuses.

In this exemplary embodiment, the device 12 is, for example, an image forming device. The image forming device (device 12) has at least one of, for example, a scanning function, a printing function, a copying function, and a facsimile function. By executing the scanning function, a document is read and scan data (image data) is generated. By executing the printing function, an image is printed on a recording medium such as paper. By executing the copying function, a document is read and printed on a recording medium. By executing the facsimile function, image data is transmitted or received by facsimile. A cooperative function that uses plural functions may be executed. For example, a scanning/transferring function that is a combination of the scanning function and a transmitting function (transferring function) may be executed. By executing the scanning/transferring function, a document is read and scan data (image data) is generated. Then, the scan data is transmitted to an external apparatus. This cooperative function is merely an example and a different cooperative function may be executed.

The terminal apparatus 14 is an apparatus such as a personal computer (PC), a tablet PC, a smartphone, or a mobile phone and has a function of transmitting and receiving data to and from other apparatuses. The terminal apparatus 14 may also be a wearable terminal (such as a wristwatch type terminal, a wristband type terminal, an eyeglass type terminal, a ring type terminal, a contact lens type terminal, a body-embedded type terminal, or a bearable terminal).

Figure 2:
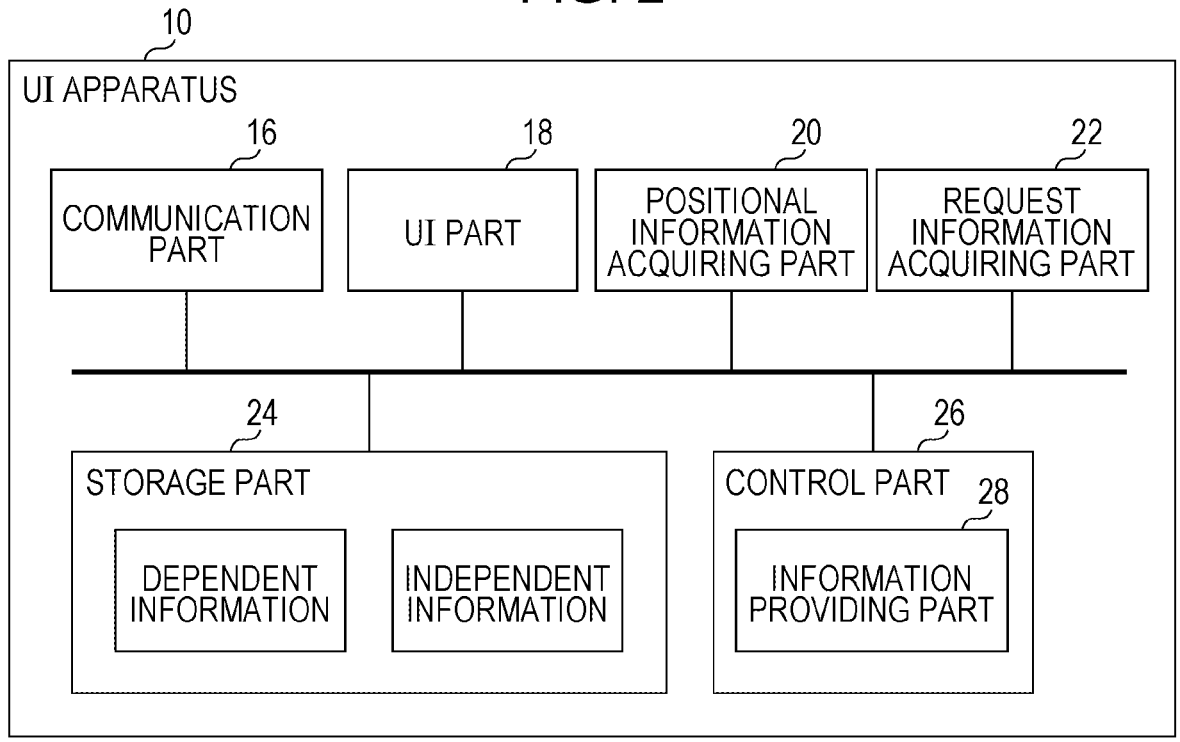
FIG. 2 is a block diagram illustrating a UI apparatus.

The configuration of the UI apparatus 10 is described below in detail with reference to FIG. 2. FIG. 2 illustrates an example of the configuration of the UI apparatus 10.

A communication part 16 is a communication interface and has functions of transmitting data to other apparatuses and receiving data from other apparatuses. The communication part 16 may be a communication interface having a wireless communication function or a wired communication function. For example, the communication part 16 may be compatible with one or plural types of communication scheme and communicate with a communication partner in accordance with a communication scheme suitable for the communication partner (that is, a communication scheme that the communication partner is compatible with). For example, the communication scheme is infrared communication, visible light communication, Wi-Fi (registered trademark) communication, or close proximity wireless communication (for example, near field communication (NFC)). Examples of the close proximity wireless communication to be used include Felica (registered trademark), Bluetooth (registered trademark), and radio frequency identifiers (RFID). Wireless communication that employs a different scheme may be used as the close proximity wireless communication. For example, the communication part 16 may switch the communication scheme or the frequency band in accordance with a communication partner or a surrounding environment.

A UI part 18 is a user interface and includes a display part and an operation part. For example, the display part is a display device such as a liquid crystal display. For example, the operation part is an input device such as a touch panel or a keyboard. A user interface that functions as both of the display part and the operation part (including a touch display or a device that electronically displays a keyboard or the like on a display) may be used as well. The UI part 18 may include a sound collecting part such as a microphone or a sound generating part such as a loudspeaker. In this case, information may be input to the UI apparatus 10 by audio input or information may be output by sound.

A positional information acquiring part 20 has a function of acquiring pieces of information indicating the positions of the user, the UI apparatus 10, the device 12, and the terminal apparatus 14 (positional information). By using those pieces of positional information, a positional relationship among the user, the UI apparatus 10, the device 12, and the terminal apparatus 14 is detected. If the user carries the terminal apparatus 14, the positional information acquiring part 20 may acquire the positional information of the user or the terminal apparatus 14. For example, the positional information acquiring part 20 may detect a relative position of the device 12 to the UI apparatus 10 based on the strength of a signal used in the communication between the UI apparatus 10 and the device 12 and detect a relative position of the terminal apparatus 14 to the UI apparatus 10 based on the strength of a signal used in the communication between the UI apparatus 10 and the terminal apparatus 14. The positional information acquiring part 20 may acquire the positional information of each of the UI apparatus 10, the device 12, and the terminal apparatus 14 by using a global positioning system (GPS) function. If an object (for example, the user) is imaged by an imaging device such as a camera, the positional information acquiring part 20 may detect a relative position of the object to the UI apparatus 10 based on an image generated by the imaging.

The positional information acquiring part 20 may be provided in the device 12 instead of the UI apparatus 10 or may separately be provided outside the UI apparatus 10 or the device 12.

A request information acquiring part 22 has a function of acquiring information indicating a user's request (request information). For example, the request information acquiring part 22 may presume (determine) the user's request based on the position of the user, audio input, an operation for the UI part 18, or a user's action (for example, a gesture).

A storage part 24 is a storage device such as a hard disk drive or a memory (for example, an SSD). The storage part 24 stores the dependent information, the independent information, various types of data, various programs, information indicating an address of the UI apparatus 10 (address information), information indicating addresses of other apparatuses (for example, the device 12 and the terminal apparatus 14) (address information), and the like. Those pieces of information may be stored in different storage devices or a single storage device. The dependent information and the independent information need not be stored in the storage part 24.

A control part 26 has a function of controlling operations of the respective parts of the UI apparatus 10. For example, the control part 26 controls communication performed by the communication part 16 and information display on the display part of the UI part 18. The control part 26 includes an information providing part 28.

The information providing part 28 has a function of providing information in response to the user's request. The information providing part 28 may display the information on the display part of the UI part 18 in response to the user's request, may output the information as sound by using the loudspeaker, or may transmit the information to the terminal apparatus 14.

For example, the information providing part 28 provides information based on a positional relationship among the user, the UI apparatus 10, and the device 12, the request information, the type of the device 12, the state of the device 12, and an information providing method. The information to be provided is the dependent information or the independent information described above. The information providing part 28 may provide the dependent information or the independent information by acquiring the dependent information or the independent information from the storage part 24, may acquire the dependent information or the independent information from an external apparatus (for example, a server), or may search for the dependent information or the independent information to be provided by using the Internet or the like and provide the dependent information or the independent information as a result of the search.

When a user is identified, the information providing part 28 may provide dependent information unique to the user. For example, the user is identified by using biometric authentication or an IC card. Examples of the biometric authentication to be used include facial recognition authentication, voice recognition authentication, fingerprint recognition authentication, iris recognition authentication, retina recognition authentication, and palm vein recognition authentication. For example, a user's face is imaged by the imaging device such as a camera and the control part 26 identifies the user subjected to the imaging by applying the facial recognition authentication technology to an image generated by the imaging. The voice recognition authentication or the like is executed similarly to the facial recognition authentication. Information recorded on an IC card such as an employee ID card or a student ID card may be read by a reading device provided in or near the UI apparatus 10 and the control part 26 may identify the user based on the read information. For example, personal information of the user (for example, a name, an age, a sex, or an organization) is recorded on the IC card and the control part 26 identifies the user based on the recorded information. When the user is identified as described above, the information providing part 28 may acquire information related to the identified user (user information) and provide dependent information based on the acquired information. For example, the information providing part 28 acquires user's schedule information, user's organization information, or the personal information described above as the user information and provides dependent information based on the acquired information. The schedule information is a record of a user's schedule in the future, actions in the past, and the like. The information providing part 28 may acquire the user information from the terminal apparatus 14 carried by the user or from an apparatus other than the terminal apparatus 14 (for example, a server).

Figure 3:
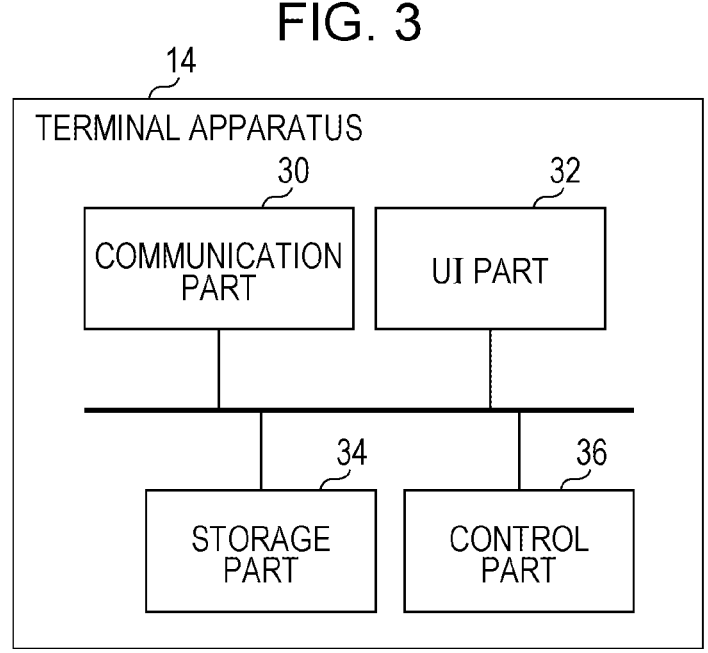
FIG. 3 is a block diagram illustrating a terminal apparatus.

The configuration of the terminal apparatus 14 is described below in detail with reference to FIG. 3. FIG. 3 illustrates an example of the configuration of the terminal apparatus 14.

A communication part 30 is a communication interface and has functions of transmitting data to other apparatuses and receiving data from other apparatuses. The communication part 30 may be a communication interface having a wireless communication function or a wired communication function. For example, the communication part 30 may be compatible with one or plural types of communication scheme and communicate with a communication partner in accordance with a communication scheme suitable for the communication partner. For example, the communication part 30 may switch the communication scheme or the frequency band in accordance with a communication partner or a surrounding environment.

A UI part 32 is a user interface and includes a display part and an operation part. For example, the display part is a display device such as a liquid crystal display. For example, the operation part is an input device such as a touch panel or a keyboard. A user interface that functions as both of the display part and the operation part may be used as well.

A storage part 34 is a storage device such as a hard disk drive or a memory (for example, an SSD). The storage part 34 stores various types of data, various programs, information indicating addresses of other apparatuses (for example, the UI apparatus 10 and the device 12) (address information), and the like. Those pieces of information may be stored in different storage devices or a single storage device.

A control part 36 has a function of controlling operations of the respective parts of the terminal apparatus 14. For example, the control part 36 controls communication performed by the communication part 30 and information display on the display part of the UI part 32.

Figure 4:
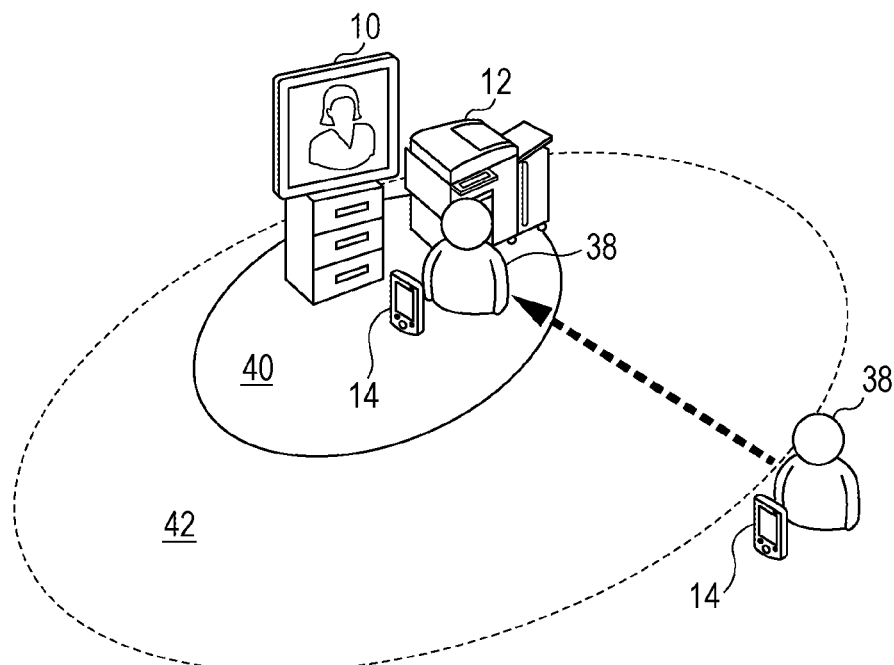
FIG. 4 illustrates an overview of a positional relationship among a user, the UI apparatus, and a device.

An overview of the positional relationship among the user, the UI apparatus 10, and the device 12 is described below with reference to FIG. 4. FIG. 4 illustrates the positional relationship. For example, a user 38 carries the terminal apparatus 14. For example, the control part 26 of the UI apparatus 10 defines areas based on the position of the UI apparatus 10, the position of the device 12, or other positions (for example, a position based on the positions of both of the UI apparatus 10 and the device 12). For example, the control part 26 defines the areas based on the strength of the signal used in the communication between the devices or an imaging result from the imaging device. In the example illustrated in FIG. 4, two areas (first area 40 and second area 42) are defined. The second area 42 is defined outside the first area 40. Three or more areas or a single area may be defined. The shape of each area is a circular shape, an elliptical shape, a rectangular shape, or the like. The shape of each area may be any other arbitrary shape. A method for defining the areas is described in detail later.

For example, the information providing part 28 provides information (for example, dependent information or independent information) based on the position of the user 38 (terminal apparatus 14). The positional information of the user 38 is acquired by the positional information acquiring part 20. For example, the information providing part 28 provides information based on a situation in which the user 38 is located outside the second area 42, within the second area 42, or within the first area 40.

Figure 5:
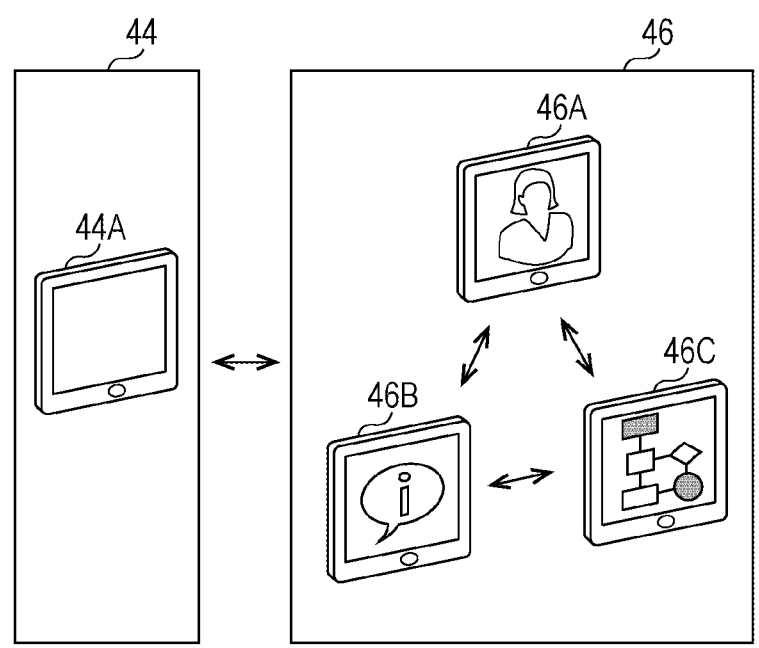
FIG. 5 illustrates examples of an operation mode.

Information to be provided by the information providing part 28 is described below in detail with reference to FIG. 5. FIG. 5 illustrates examples of an operation mode to be executed by the UI apparatus 10. In a broad category, the information providing part 28 executes a public providing mode represented by reference symbol 44 or an on-demand providing mode represented by reference symbol 46.

For example, the public providing mode includes a power saving mode and a general information providing mode (reference symbol 44A).

For example, the power saving mode is a mode in which the power of the display part of the UI apparatus 10 is kept in a standby state. In the power saving mode, the information providing part 28 does not provide information.

The general information providing mode is a mode in which the independent information (information that does not depend on the device 12 and is not unique to the user) is provided. In the general information providing mode, the information providing part 28 provides, for example, general information in a company, weather information, or advertisement information as the independent information. The information providing part 28 may provide those pieces of information by acquiring the information via a communication path such as the Internet or a local area network (LAN). The information providing part 28 may display the independent information on the UI part 18 or may output the independent information as audio information by sound from the loudspeaker.

For example, the on-demand providing mode includes a conversation mode (reference symbol 46A), an information providing mode (reference symbol 46B), and an operating mode (reference symbol 46C).

The conversation mode (reference symbol 46A) is a mode in which the user and the UI apparatus 10 have a conversation (corresponding to a first mode). In the conversation mode, the information providing part 28 has a conversation with the user by using, for example, artificial intelligence (AI). The information providing part 28 analyzes a user's speech or action to provide a response to the speech or action. The information providing part 28 may display information indicating the response on the UI part 18 or may output the response information as audio information by sound from the loudspeaker. For example, the information providing part 28 may provide a question about the device 12 to the user or may receive a response about the device 12 from the user and provide information related to the response to the user. The information providing part 28 may have a learning function that uses the artificial intelligence and have an ability to make a determination close to the human level owing to the learning function. There may be used neural network type deep learning or reinforcement learning in which a learning field is partially reinforced. In addition, there may be used genetic algorithms, cluster analysis, self-organizing maps, ensemble learning, or the like. There may be used technologies related to the artificial intelligence other than the above-mentioned technologies. The information to be provided in the conversation mode is information related to the conversation with the user and may therefore be regarded as information unique to the user. When a conversation related to the device 12 is made, this event may be regarded as a situation in which the dependent information of the device 12 is provided to the user.

The information providing mode (reference symbol 46B) is a mode in which the dependent information (information that depends on the device 12, information unique to the user, or information unique to the user about the device 12) is provided (corresponding to a second mode). In the information providing mode, the information providing part 28 provides, for example, the information related to the device 12 or the information unique to the user about the device 12 as the dependent information. The information providing part 28 may display the dependent information on the UI part 18 or may output the dependent information as audio information by sound from the loudspeaker. The information providing part 28 may acquire the information related to the device 12 from the device 12 itself or from an external apparatus such as a server.

The operating mode (reference symbol 46C) is a mode in which information related to an operation for the device 12 is provided (corresponding to a third mode). In the operating mode, the information providing part 28 provides, for example, information for setting details of processing to be executed by the device 12 (for example, information for setting an operation condition or a processing condition of the device 12) or information for giving an instruction to execute the processing as the information related to the operation for the device 12. The information providing part 28 may provide a screen for editing information to be processed by the device 12 (for example, document data or image data). The information providing part 28 may display the information related to the operation for the device 12 on the UI part 18 or may output the information as audio information by sound from the loudspeaker. The information to be provided in the operating mode is the information related to the operation for the device 12 and may therefore be regarded as the dependent information of the device 12. When operation information unique to the user is provided, this event may be regarded as a situation in which the information unique to the user is provided to the user.

In the on-demand providing mode, the information providing part 28 executes any one of the conversation mode (reference symbol 46A), the information providing mode (reference symbol 46B), and the operating mode (reference symbol 46C) by switching the conversation mode (reference symbol 46A), the information providing mode (reference symbol 46B), and the operating mode (reference symbol 46C) based on, for example, the positional relationship among the user, the UI apparatus 10, and the device 12, the request information, the type of the device 12, the state of the device 12, and the information providing method.

Figure 6:
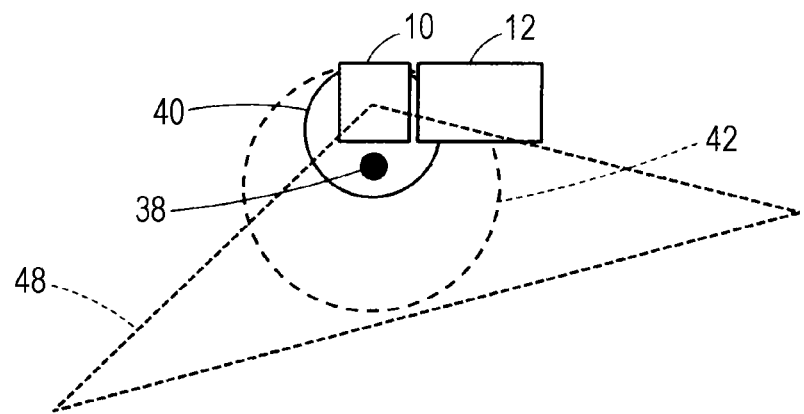
FIG. 6 illustrates an overview of the positional relationship among the user, the UI apparatus, and the device.

Processing for detecting the positional relationship among the user, the UI apparatus 10, and the device 12 is described below with reference to FIG. 6. FIG. 6 illustrates an overview of the positional relationship.

For example, the positional information acquiring part 20 detects a relative positional relationship between the UI apparatus 10 and the device 12 based on the strength of the signal used in the communication between the UI apparatus 10 and the device 12 and detects a relative positional relationship between the UI apparatus 10 and the terminal apparatus 14 carried by the user based on the strength of the signal used in the communication between the UI apparatus 10 and the terminal apparatus 14 (user). For example, BLUETOOTH™ Low Energy (BLE) is used for detecting the position based on the signal strength. A communication scheme other than BLUETOOTH™ Low Energy may be used.

As another example, the imaging device such as a camera may image an object (for example, the user or the device 12) and the positional information acquiring part 20 may detect a relative positional relationship between the UI apparatus 10 and the object based on an image generated by the imaging. An imaging area 48 is defined by an angle of view of the camera provided in the UI apparatus 10 and an object in the imaging area 48 is imaged. The positional information acquiring part 20 may detect the positional relationship based on both of the communication signal strength and the image.

The control part 26 of the UI apparatus 10 defines the first area 40 and the second area 42 based on the communication signal strength described above. For example, the first area 40 and the second area 42 are herein defined based on the position of the UI apparatus 10.

The control part 26 defines, as the first area 40, an area where the signal strength of the communication with the UI apparatus 10 is equal to or higher than a predetermined first strength threshold. The control part 26 defines, as the second area 42, an area where the signal strength of the communication with the UI apparatus 10 is lower than the first strength threshold and is equal to or higher than a predetermined second strength threshold. The second strength threshold is lower than the first strength threshold. An area where the signal strength of the communication with the UI apparatus 10 is lower than the second strength threshold is an area outside the second area.

For example, when the signal strength of the communication between the UI apparatus 10 and the terminal apparatus 14 carried by the user is equal to or higher than the first strength threshold, the control part 26 determines that the user is located within the first area 40. When the signal strength of the communication between the UI apparatus 10 and the terminal apparatus 14 is lower than the first strength threshold and is equal to or higher than the second strength threshold, the control part 26 determines that the user is located within the second area 42.

When an object is imaged by the imaging device, the control part 26 may determine the area where the user is located by using a result of analysis of an image generated by the imaging. For example, when the ratio of an image showing a user's face to the entire image generated by the imaging (for example, the ratio of the area of the face image to the area of the entire image) is equal to or higher than a first ratio threshold, the control part 26 determines that the user is located within the first area 40. When the ratio of the face image is lower than the first ratio threshold and is equal to or higher than a second ratio threshold, the control part 26 determines that the user is located within the second area 42.

The control part 26 may detect the location of the user by using both of the communication signal strength and the image analysis result. For example, when the signal strength of the communication between the UI apparatus 10 and the terminal apparatus 14 is equal to or higher than the first strength threshold and when the ratio of the face image is equal to or higher than the first ratio threshold, the control part 26 determines that the user is located within the first area 40. As another example, when the signal strength is equal to or higher than the first strength threshold or when the ratio of the face image is equal to or higher than the first ratio threshold, the control part 26 may determine that the user is located within the first area 40.

When the communication signal strength is lower than the first strength threshold and is equal to or higher than the second strength threshold and when the ratio of the face image is lower than the first ratio threshold and is equal to or higher than the second ratio threshold, the control part 26 may determine that the user is located within the second area 42. As another example, when the communication signal strength is lower than the first strength threshold and is equal to or higher than the second strength threshold or when the ratio of the face image is lower than the first ratio threshold and is equal to or higher than the second ratio threshold, the control part 26 may determine that the user is located within the second area 42.

By using both of the communication signal strength and the image analysis result, the user detection accuracy is improved compared with a case of using one of the communication signal strength and the image analysis result. Depending on, for example, user's body features (for example, a height) or use of a wheelchair, the user's face may be located outside the imaging area of the imaging device in a height direction. In this case, the position of the user is detected more accurately by using the communication signal strength.

Figure 7A:
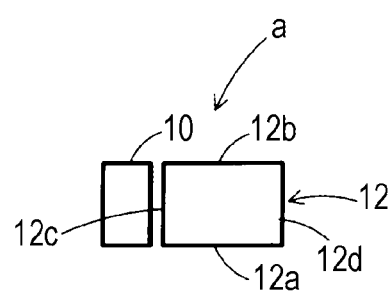
FIGS. 7A to 7D illustrate arrangement relationships between the UI apparatus and the device.
Figure 7B:
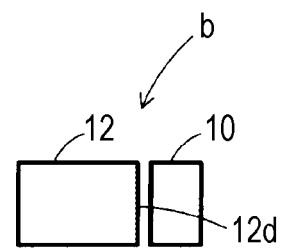
Figure 7C:
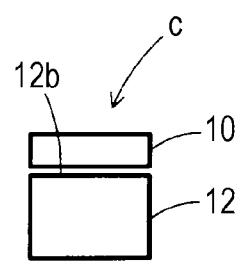
Figure 7D:
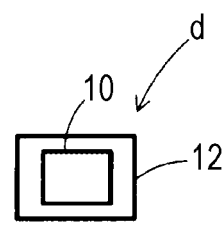

An arrangement relationship between the UI apparatus 10 and the device 12 is described below with reference to FIGS. 7A to 7D. FIGS. 7A to 7D illustrate examples of the arrangement relationship. For example, the device 12 has a front side 12a, a rear side 12b, a right side 12c, and a left side 12d. FIG. 7A illustrates a positional relationship (a). In the positional relationship (a), the UI apparatus 10 is arranged with spacing from the device 12 or in contact with the right side 12c of the device 12 at a position where the UI apparatus 10 faces the right side 12c. FIG. 7B illustrates a positional relationship (b). In the positional relationship (b), the UI apparatus 10 is arranged with spacing from the device 12 or in contact with the left side 12d of the device 12 at a position where the UI apparatus 10 faces the left side 12d. FIG. 7C illustrates a positional relationship (c). In the positional relationship (c), the UI apparatus 10 is arranged with spacing from the device 12 or in contact with the rear side 12b of the device 12 at a position where the UI apparatus 10 faces the rear side 12b. FIG. 7D illustrates a positional relationship (d). In the positional relationship (d), the UI apparatus 10 is arranged on top of the device 12. The arrangement relationships illustrated in FIGS. 7A to 7D are merely examples and the UI apparatus 10 and the device 12 may be arranged in an arrangement relationship other than those arrangement relationships.

Figure 8:
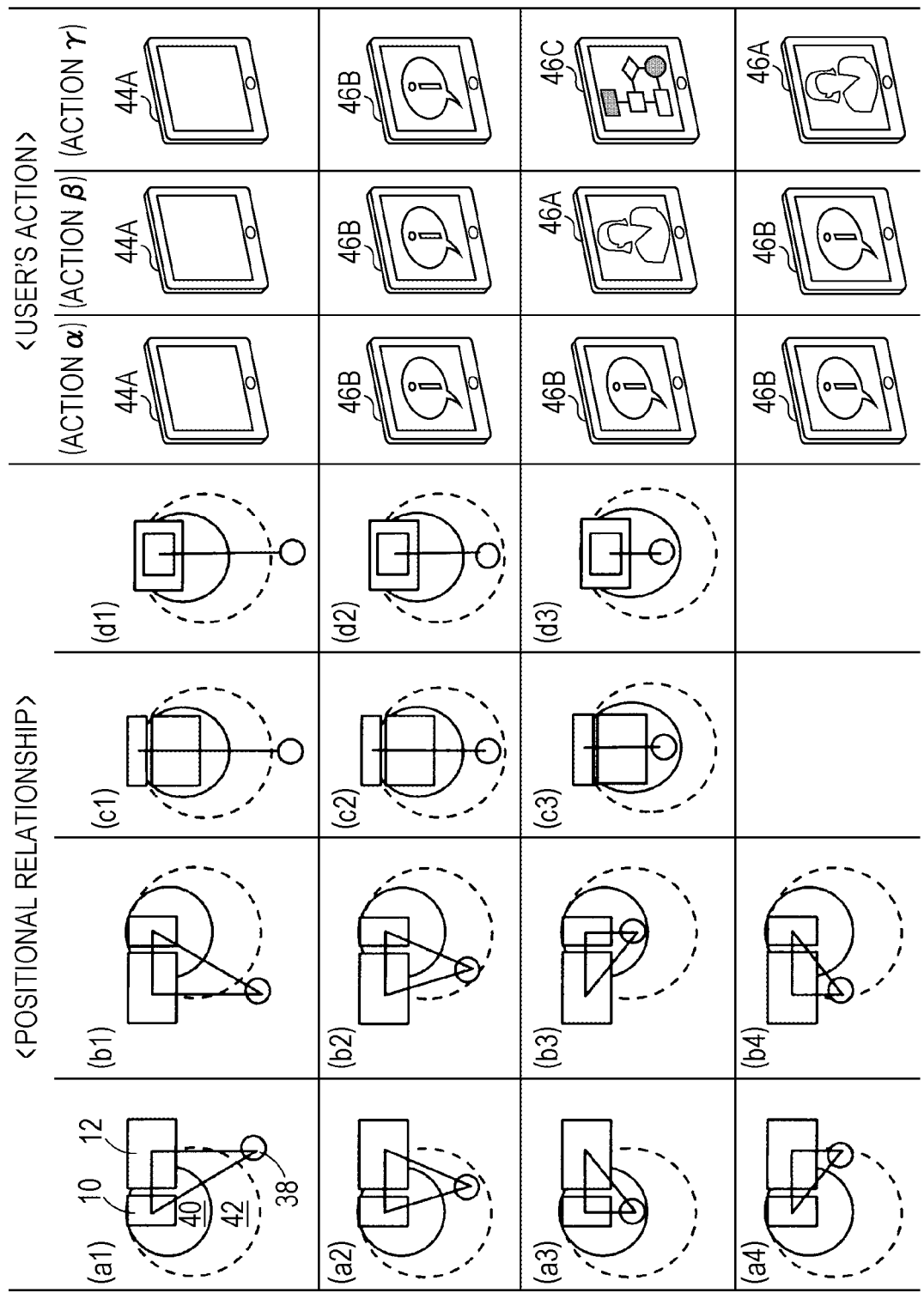
FIG. 8 illustrates correspondences among the positional relationship, a user's action, and the operation mode.

An operation mode to be executed based on the positional relationship and the user's action is described below in detail with reference to FIG. 8. FIG. 8 illustrates correspondences among the positional relationship, the user's action, and the operation mode.

In positional relationships (a1), (a2), (a3), and (a4), the positional relationship between the UI apparatus 10 and the device 12 is identical to the positional relationship (a) illustrated in FIG. 7A and the UI apparatus 10 is arranged close to the right side 12c of the device 12. In positional relationships (b1), (b2), (b3), and (b4), the positional relationship between the UI apparatus 10 and the device 12 is identical to the positional relationship (b) illustrated in FIG. 7B and the UI apparatus 10 is arranged close to the left side 12d of the device 12. In positional relationships (c1), (c2), and (c3), the positional relationship between the UI apparatus 10 and the device 12 is identical to the positional relationship (c) illustrated in FIG. 7C and the UI apparatus 10 is arranged close to the rear side 12b of the device 12. In positional relationships (d1), (d2), and (d3), the positional relationship between the UI apparatus 10 and the device 12 is identical to the positional relationship (d) illustrated in FIG. 7D and the UI apparatus 10 is arranged on top of the device 12. In FIG. 8, the user 38 (terminal apparatus 14) is indicated by a circular object, the first area 40 is indicated by a solid line, and the second area 42 is indicated by a broken line.

In the positional relationships (a1), (a2), (a3), (a4), (b1), (b2), (b3), and (b4), the first area 40 and the second area 42 are defined based on the position of the UI apparatus 10. In the positional relationships (c1), (c2), and (c3), the first area 40 and the second area 42 are defined based on the position of the device 12. In the positional relationships (d1), (d2), and (d3), the first area 40 and the second area 42 are defined based on the position of the UI apparatus 10 or the device 12.

As the user's action (gesture), an action α, an action β, and an action γ are exemplified. The action α indicates a state in which the user does not execute any specific action. The action β is a specific action related to the line of sight of the user. For example, the action β is such an action that the user turns the line of sight to the UI apparatus 10 or the device 12. The action γ is such a specific action that the user moves the hand closer to the UI apparatus 10 or the device 12.

For example, the imaging device such as a camera is provided in or near the UI apparatus 10 and the user is imaged by the imaging device. The request information acquiring part 22 acquires image data obtained by the imaging (still image data or moving image data) from the imaging device and detects the user's action by analyzing the image data. Evaluation may be made to indicate that the user's action reflects a user's request. The request information acquiring part 22 detects the user's action to acquire information indicating the user's action as information indicating the user's request. For example, the request information acquiring part 22 analyzes the image data to detect the line of sight of the user that corresponds to the action β or the movement of the hand that corresponds to the action γ. The request information acquiring part 22 acquires the action as the user's request.

Information indicating correspondence among the positional relationship, the user's action, and the operation mode illustrated in FIG. 8 is created in advance and is stored in the storage part 24 of the UI apparatus 10. The information providing part 28 executes the operation mode associated with the positional relationship and the user's action by referring to the information indicating the correspondence (for example, the table illustrated in FIG. 8).

The operation mode to be executed is described below in detail taking specific examples.

For example, when the user 38 is located outside the second area 42 as in the positional relationships (a1), (b1), (c1), and (d1) (that is, when the control part 26 determines that the user is located neither within the first area 40 nor within the second area 42), the information providing part 28 executes the public providing mode (reference symbol 44A) irrespective of the details of the detected user's action. When the user 38 is located outside the second area 42, the public providing mode is executed irrespective of the positional relationship among the user 38, the UI apparatus 10, and the device 12. As the public providing mode, the information providing part 28 may execute the power saving mode or the general information providing mode. In the general information providing mode, the information providing part 28 provides, for example, general information in a company, weather information, or advertisement information as the independent information. When the user 38 is located outside the second area 42, it is predicted that the possibility of use of the UI apparatus 10 or the device 12 by the user 38 at that timing is lower than in the case in which the user 38 is located within the first area 40 or the second area 42. Therefore, the public providing mode (the power saving mode in which information is not provided or the general information providing mode in which information that is not unique to the user 38 is provided) is executed.

When the user 38 is located at a position other than the front side of the device 12 and the front side of the UI apparatus 10 within the second area 42 as in the positional relationships (a2) and (b2) (that is, when the control part 26 determines that the user is located at a position other than the front side of the device 12 and the front side of the UI apparatus 10 within the second area 42), the information providing part 28 executes the information providing mode (reference symbol 46B) as the on-demand providing mode irrespective of the details of the detected user's action. Similarly when the user 38 is located at a position corresponding to the front side of the UI apparatus 10 within the second area 42 as in the positional relationships (c2) and (d2) (that is, when the control part 26 determines that the user is located at a position corresponding to the front side of the UI apparatus 10 within the second area 42), the information providing part 28 executes the information providing mode (reference symbol 46B) as the on-demand providing mode irrespective of the details of the detected user's action. In the information providing mode, as described above, the user 38 is identified and the information providing part 28 provides information unique to the user 38 about the device 12. When the user 38 is located at a position corresponding to the front side of the UI apparatus 10 within the second area 42 or at a position other than the front side of the device 12 within the second area 42, it is predicted that the possibility of use of the UI apparatus 10 or the device 12 by the user 38 at that timing is higher than in the case in which the user 38 is located outside the second area 42. Therefore, the on-demand providing mode is executed. When the user 38 is located at a position corresponding to the front side of the UI apparatus 10 or at a position other than the front side of the device 12 within the second area 42, it is predicted that the possibility of use of the UI apparatus 10 or the device 12 by the user 38 at that timing is lower than in the case in which the user 38 is located within the first area 40. Therefore, the information providing mode is executed as the on-demand providing mode.

When the user 38 is located within the first area 40 as in the positional relationships (a3), (b3), (c3), and (d3) (that is, when the control part 26 determines that the user 38 is located within the first area 40), the information providing part 28 executes an operation mode based on the user's action. The information providing part 28 executes an operation mode based on the user's action irrespective of the actual position of the user 38 within the first area 40.

For example, when the action α is detected as the user's action, the information providing part 28 executes the information providing mode (reference symbol 46B) as the on-demand providing mode. In the information providing mode, the user 38 is identified and the information providing part 28 provides dependent information related to the user by acquiring information on the identified user 38 (user information) and analyzing the user information. When the user 38 is located within the first area 40 but no specific action (for example, an action related to the line of sight or an action of moving closer to the UI apparatus 10 or the device 12) is executed by the user 38, it is predicted that the possibility of use of the UI apparatus 10 or the device 12 by the user 38 is lower than in the case in which the specific action is executed. Therefore, the information providing mode is executed as the on-demand providing mode.

When the action β is detected as the user's action, the information providing part 28 executes the conversation mode (reference symbol 46A) as the on-demand providing mode. In the conversation mode, the user 38 is identified and the information providing part 28 has a conversation with the user 38 by using, for example, the artificial intelligence. In this case, the information providing part 28 provides, to the user 38, a unique question or response related to the user by acquiring information on the identified user 38 (user information) and analyzing the user information.

When the action γ is detected as the user's action, the information providing part 28 executes the operating mode (reference symbol 46C) as the on-demand providing mode. In the operating mode, the information providing part 28 provides information related to an operation for the device 12. In the operating mode, the user 38 is identified and the information providing part 28 provides operation information that is related to the operation for the device 12 and is unique to the user 38 by acquiring information on the identified user 38 (user information) and analyzing the user information.

When the user 38 is located at a position corresponding to the front side of the device 12 within the second area 42 as in the positional relationships (a4) and (b4) (that is, when the control part 26 determines that the user is located in front of the device 12 within the second area 42), the information providing part 28 executes an operation mode based on the user's action.

For example, when the action α or the action β is detected as the user's action, the information providing part 28 executes the information providing mode (reference symbol 46B) as the on-demand providing mode. When the action γ is detected as the user's action, the information providing part 28 executes the conversation mode (reference symbol 46A) as the on-demand providing mode. When the user is located in front of the device 12 within the second area 42 but the action of moving closer to the UI apparatus 10 or the device 12 is not executed by the user 38, it is predicted that the possibility of use of the UI apparatus 10 or the device 12 by the user 38 is lower than in the case in which the action of moving closer to the UI apparatus 10 or the device 12 is executed. Therefore, when the action α or the action β is detected, the information providing mode is executed. When the action γ (action of moving closer to the UI apparatus 10 or the device 12) is detected, the user may execute some operation and therefore the conversation mode (reference symbol 46A) is executed.

An operation mode to be executed based on the positional relationship, the user's action, and the state of the device 12 is described below.

For example, when the state of the device 12 corresponds to a standby state or an operating state and the action α, the action β, or the action γ is detected as the user's action, the information providing part 28 executes an operation mode based on the positional relationship and the detected user's action illustrated in FIG. 8. The standby state is a state in which the power supply to a part of the device 12 is stopped. The operating state is a state in which the device 12 is activated and processing is executable.

When the state of the device 12 corresponds to an error state, the information providing part 28 executes the conversation mode irrespective of the positional relationship and the user's action. For example, when a paper jam has occurred in the image forming device serving as the device 12, the information providing part 28 acquires error information related to the paper jam from the image forming device and outputs the error information in the conversation mode.

When the state of the device 12 corresponds to the error state, the information providing part 28 may execute the conversation mode to provide information related to a different device that meets the user's request. For example, the UI apparatus 10 communicates with plural devices (including the device 12) to acquire information related to each device (for example, information related to the state of each device, information related to the function of each device, or information related to the installation position of each device). The UI apparatus 10 may acquire the information related to each device at regular or irregular intervals or at arbitrary timings. When the state of the device 12 corresponds to the error state, the information providing part 28 identifies a device that meets the user's request by referring to information related to each device other than the device 12 and provides information related to the identified device to the user. The information providing part 28 may preferentially provide information related to a device that is installed at a position closer to a current position of the user. For example, the information providing part 28 provides, as information having the highest priority, information related to a device that is installed at a position closest to the current position of the user. Further, the information providing part 28 provides, as information having a lower priority, information related to a device that is installed at a position farther away from the current position of the user. The information providing part 28 may provide information related to the installation position of a different device. The information related to a different device may be displayed on the display part of the UI part 18 or may be output by sound.

When the state of the device 12 corresponds to the error state but the error corresponds to an error that does not hinder the device 12 from meeting the user's request, the information providing part 28 may execute the information providing mode or the operating mode based on the user's action. For example, as illustrated in FIG. 8, the information providing part 28 executes the information providing mode or the operating mode based on the positional relationship and the user's action. The conversation mode may be executed depending on the positional relationship and the user's action (see FIG. 8). For example, when paper contained in the image forming device serving as the device 12 has run out, the state of the image forming device becomes the error state. In this case, the copying function or the printing function remains inexecutable unless the paper is replenished. The scanning function (function of reading a document and generating image data) does not use paper and is therefore executable even if the paper is not replenished. When the user's request indicates the execution of the scanning function, the information providing part 28 executes the information providing mode or the operating mode based on a correspondence between the positional relationship and the user's action. For example, when the positional relationship corresponds to the positional relationship (a3), (b3), (c3), or (d3) in FIG. 8 and the user's action corresponds to the action α, the information providing part 28 executes the information providing mode (reference symbol 46B). When this positional relationship holds and the user's action corresponds to the action γ, the information providing part 28 executes the operating mode (reference symbol 46C). By executing the control described above, processing is executed in response to the user's request when the error has occurred but the error does not affect the user's request.

Details of the information providing operation (how the information providing operation is performed) based on the type of the information providing method and the type of the device 12 are described below in detail with reference to FIG. 9. FIG. 9 illustrates correspondences among the type of the information providing method, the type of the device 12, and details of the operation (how the operation is performed).

FIG. 9 illustrates "visual", "audio", and "general" as examples of the information providing method.

The "visual" providing method is a method of providing information by displaying the information. For example, when the "visual" providing method is executed, information provided by the information providing part 28 is displayed on the display part of the UI part 18. As another example, the information provided by the information providing part 28 may be transmitted from the UI apparatus 10 to the terminal apparatus 14 and displayed on the UI part 32 of the terminal apparatus 14. For example, the "visual" providing method is executed when the information provided by the information providing part 28 corresponds to information displayable on the display part (for example, an image or a character string), when the display part is provided in the UI apparatus 10, or when the display part is provided in the terminal apparatus 14. The information provided by the information providing part 28 may be transmitted from the UI apparatus 10 to the device 12 and displayed on a display part of the device 12.

The "audio" providing method is a method of providing information by sound. For example, when the "audio" providing method is executed, information provided by the information providing part 28 is output as sound from the loudspeaker provided in the UI apparatus 10. As another example, the information provided by the information providing part 28 may be transmitted from the UI apparatus 10 to the terminal apparatus 14 and output as sound from a loudspeaker provided in the terminal apparatus 14. For example, the "audio" providing method is executed when the information provided by the information providing part 28 corresponds to information outputtable as audio information (for example, audio information itself or a character string), when the loudspeaker is provided in the UI apparatus 10, or when the loudspeaker is provided in the terminal apparatus 14. The information provided by the information providing part 28 may be transmitted from the UI apparatus 10 to the device 12 and output as audio information from the device 12.

The "general" providing method is an information providing method that is common to the "visual" and "audio" providing methods. For example, the "general" providing method may be executed along with the execution of the "visual" providing method or the execution of the "audio" providing method. Both the "visual" and "audio" providing methods may be executed.

FIG. 9 illustrates a "multifunction peripheral", a "projector", and "devices in general" as examples of the type of the device 12. The "multifunction peripheral" serving as the device 12 corresponds to an example of the image forming device and has at least one of, for example, the scanning function, the printing function, the copying function, and the facsimile function. The "projector" serving as the device 12 is a device having a function of projecting an image. Information to be provided to the "multifunction peripheral" and the "projector" in common is defined in each item corresponding to the "devices in general".

Details of the information providing operation (how the information providing operation is performed) are defined in association with the type of the information providing method and the type of the device 12. The information providing part 28 provides information in accordance with the details of the information providing operation (how the information providing operation is performed). Information indicating the correspondence among the type of the information providing method, the type of the device 12, and the details of the information providing operation (how the information providing operation is performed) illustrated in FIG. 9 is defined in advance and is stored in the storage part 24 of the UI apparatus 10. For example, the information providing part 28 executes the details of the operation associated with the information providing method and the type of the device 12 by referring to the information indicating the correspondence (for example, the table illustrated in FIG. 9).

The details of the information providing operation are described below in detail taking specific examples.

When the device 12 is the "multifunction peripheral" and the "visual" providing method is used and when the on-demand providing mode described above is executed, the information providing part 28 executes the "conversation mode", the "information providing mode", or the "operating mode" by switching the "conversation mode", the "information providing mode", and the "operating mode" based on the positional relationship and the user's action.

When the device 12 is the "multifunction peripheral" and the "audio" providing method is used and when it is detected that the user is located within the first area 40, the information providing part 28 provides information by sound. When it is detected that the user is located within the second area 42, the information providing part 28 does not provide information by sound.

When the device 12 is the "multifunction peripheral" and the "general" providing method is used, the control part 26 controls the UI apparatus 10 and the "multifunction peripheral" to enable a print operation during the execution of the "information providing mode".

When the device 12 is the "projector" and the "visual" providing method is used, the information providing part 28 provides information for recommending, to the user, documents that have ever been projected on the "projector" during the execution of the "information providing mode". For example, when the user is identified, the information providing part 28 may search for documents that have ever been used by the user for projection and display information related to the documents on the UI part 18. The information providing part 28 may search for documents that have ever been used by a different user for projection and display information related to the documents on the UI part 18.

When the device 12 is the "projector" and the "audio" providing method is used, the information providing part 28 does not provide dependent information by sound in default settings because of the assumption that plural users gather to use the "projector". During the execution of the "information providing mode", the control part 26 controls the UI apparatus 10 and the "projector" so that the "projector" may project detailed information on the information that is provided by the execution of the "information providing mode". In this case, the "projector" may project information that is output as audio information.

When the device 12 is the "projector" and the "general" providing method is used and when plural users are detected in the first area 40, the information providing part 28 searches for and provides additional information on contents of information that is projected on the "projector" and on contents specified by the user in the information.

When the "visual" providing method is used for the "devices in general" and when a bottom-to-top line of sight of the user is detected, the information providing part 28 displays operation part information as user interface information at the bottom of the display part of the UI part 18 in the "operating mode". For example, the operation part information is a keyboard displayed on the display part.

When the "audio" providing method is used for the "devices in general" and when the detected user is located at a distance (for example, when the user is located outside the second area 42 or when the user is located within the second area 42), the information providing part 28 turns up the volume while information is provided. Further, the control part 26 increases the sensitivity of detection of audio input. When it is detected that the user has executed an action (gesture) of putting the finger to lips, the information providing part 28 turns down the volume while the user is staying (for example, while the user is detected).

Specific examples of this exemplary embodiment are described below.

Specific Example 1

Specific Example 1 is described with reference to FIGS. 10A to 11C. FIGS. 10A to 10D illustrate details of the operation of the UI apparatus 10 and the like in Specific Example 1. FIGS. 11A to 11C illustrate positional relationships in Specific Example 1. For example, the device 12 is the image forming device.

Figure 10A:
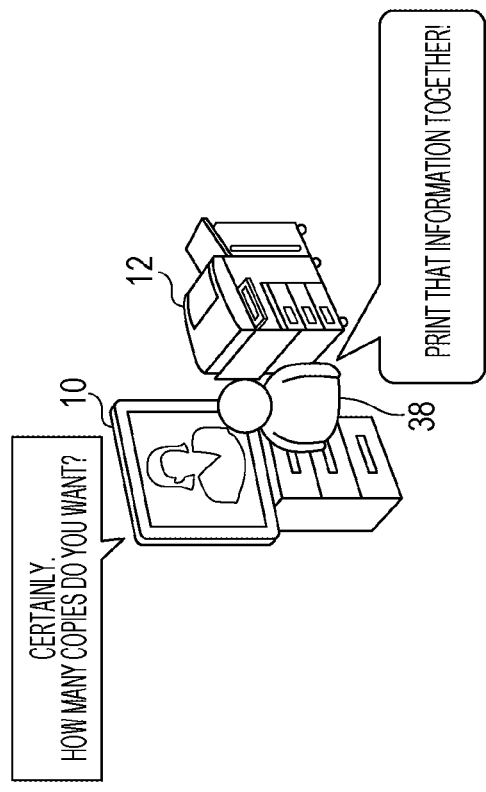
FIGS. 10A to 10D illustrate Specific Example 1.
Figure 11A:
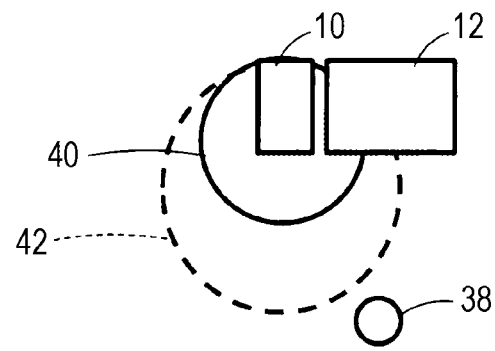
FIGS. 11A to 11C illustrate positional relationships in Specific Example 1.
Figure 11B:
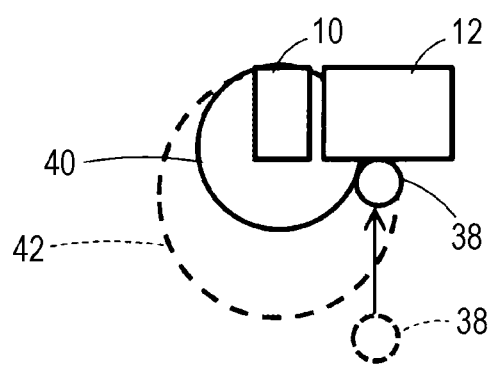
Figure 11C:
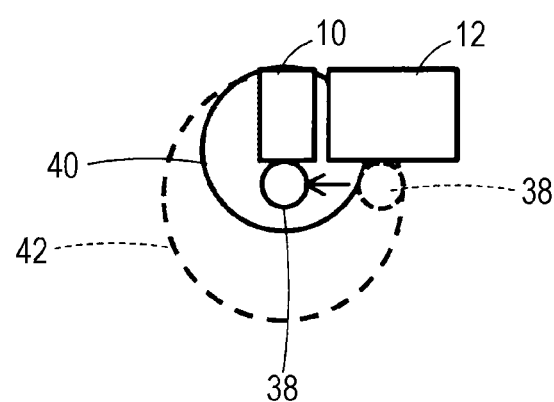

FIG. 10A illustrates a situation corresponding to the positional relationship illustrated in FIG. 11A. That is, when the user 38 is located outside the second area 42 as illustrated in FIG. 11A (when the positional relationship corresponds to the positional relationship (a1) in FIG. 8), the information providing part 28 executes the public providing mode (reference symbol 44A) irrespective of the user's action. The user 38 intends to print materials for a technical meeting by using the image forming device serving as the device 12.

When the user has moved to a position in front of the image forming device (device 12) to enter the second area 42 as illustrated in FIG. 11B, the positional relationship corresponds to the positional relationship (a4) in FIG. 8. Therefore, the information providing part 28 executes the information providing mode (reference symbol 46B) or the operating mode (reference symbol 46C) based on the user's action.

Figure 10C:
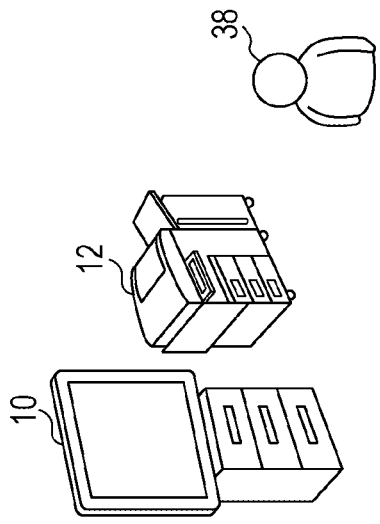
Figure 10B:
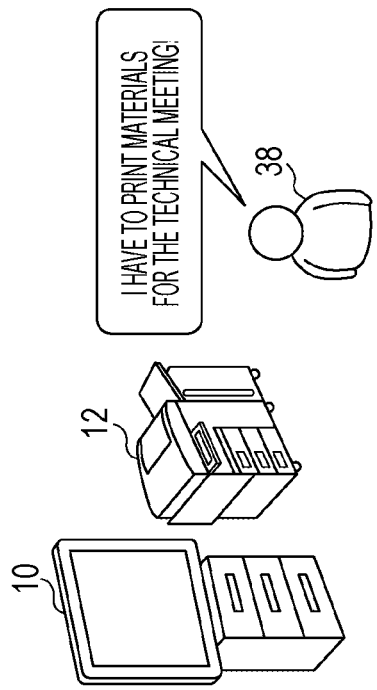

FIG. 10B illustrates a situation corresponding to the positional relationship illustrated in FIG. 11B. In this situation, the action α or the action β is detected as the action of the user 38 and the information providing part 28 executes the information providing mode as a mode corresponding to the positional relationship and the action α or the action β. At this time, the information providing part 28 identifies the user 38 by acquiring information on the user 38 (user information) and provides dependent information related to the user. For example, the information providing part 28 may acquire schedule information or organization information of the user 38, acquire information related to the schedule or the organization from a different apparatus (for example, an in-house server or a different device), and provide the acquired information. As described above, the user information is acquired by applying an authentication technology or the like. In the example illustrated in FIG. 10B, the information providing part 28 acquires information in a company to which the user 38 belongs from a different apparatus (for example, an in-house server) and provides the information in the company. For example, when the user 38 belongs to a technology development department, the information providing part 28 may provide information related to the technology development department or a different technology development department or may provide information related to a department associated with the technology development department to which the user 38 belongs (for example, a research department or a sales department). The information providing part 28 may provide information to the user 38 by selecting the information based on history information of a different user (for example, information on a history of use of information or devices). The information may be displayed on the display part of the UI part 18 or may be output as audio information.

The information providing part 28 may provide the information in the company while the user is operating the image forming device (device 12) (for example, while the user is printing materials for a technical meeting by using the image forming device). The information providing part 28 may propose printing the information in the company together with the materials that the user intends to print initially.

When the user has moved to a position in front of the UI apparatus 10 to enter the first area 40 as illustrated in FIG. 11C, the positional relationship corresponds to the positional relationship (a3) in FIG. 8. Therefore, the information providing part 28 executes the conversation mode (reference symbol 46A), the information providing mode (reference symbol 46B), or the operating mode (reference symbol 46C) based on the user's action.

FIG. 10C illustrates a situation corresponding to the positional relationship illustrated in FIG. 11C. In this situation, the action β is detected as the action of the user 38 and the information providing part 28 executes the conversation mode (reference symbol 46A) as a mode corresponding to the positional relationship and the action β. That is, it is detected that the user has executed an action of turning the line of sight to the UI apparatus 10 (action β) and the information providing part 28 executes the conversation mode based on the detection result. In the conversation mode, for example, when the user 38 has instructed the UI apparatus 10 to print the information in the company that is proposed by the information providing part 28, the UI apparatus 10 controls the image forming device (device 12) to print the information in the company. The user 38 may give the print instruction to the UI apparatus 10 by voice or by operating the display part of the UI part 18.

Figure 10D:
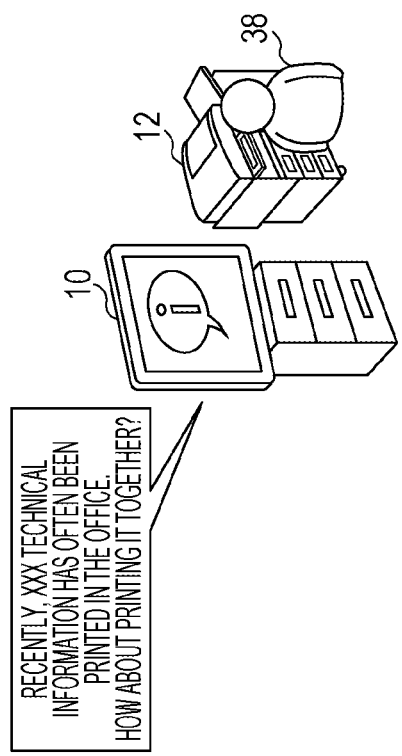

When the user 38 has moved away from the UI apparatus 10 and the image forming device (device 12) to the outside of the second area 42 as illustrated in FIG. 10D, the positional relationship corresponds to the positional relationship (a1) in FIG. 8. Therefore, the information providing part 28 executes the public providing mode (reference symbol 44A).

Specific Example 2

Specific Example 2 is described with reference to FIGS. 12A to 13C. FIGS. 12A to 12D illustrate details of the operation of the UI apparatus 10 and the like in Specific Example 2. FIGS. 13A to 13C illustrate positional relationships in Specific Example 2. For example, the device 12 is the image forming device.

Figure 12A:
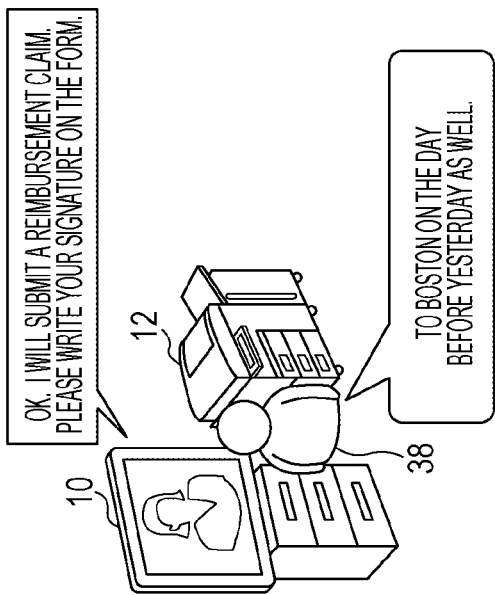
FIGS. 12A to 12D illustrate Specific Example 2.
Figure 13A:
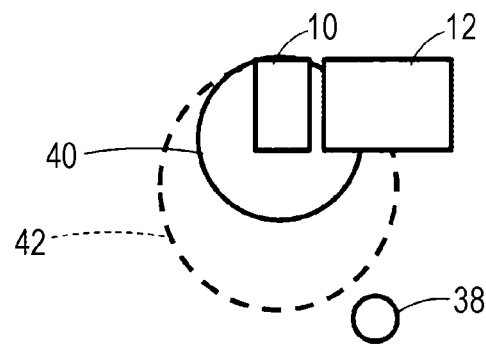
FIGS. 13A to 13C illustrate positional relationships in Specific Example 2.
Figure 13B:
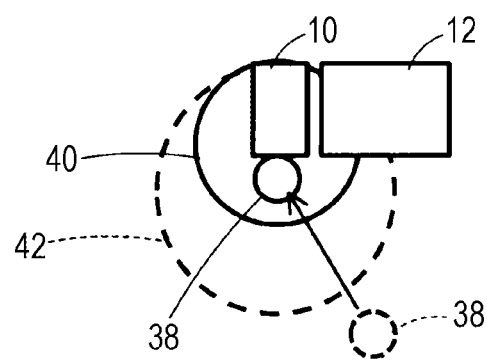
Figure 13C:
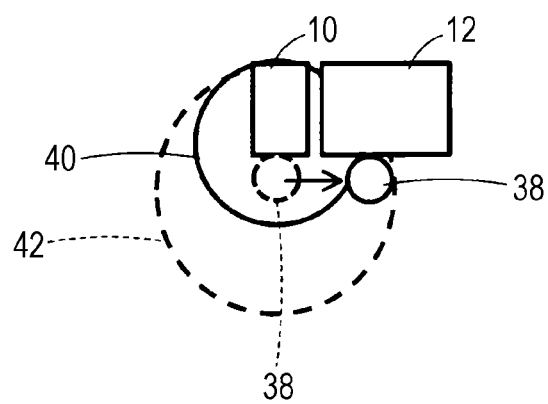

FIG. 12A illustrates a situation corresponding to the positional relationship illustrated in FIG. 13A. That is, when the user 38 is located outside the second area 42 as illustrated in FIG. 13A (when the positional relationship corresponds to the positional relationship (a1) in FIG. 8), the information providing part 28 executes the public providing mode (reference symbol 44A) irrespective of the user's action. The user 38 intends to claim travel expenses.

When the user 38 has moved to a position in front of the UI apparatus 10 to enter the first area 40 as illustrated in FIG. 13B, the positional relationship corresponds to the positional relationship (a3) in FIG. 8. Therefore, the information providing part 28 executes the conversation mode (reference symbol 46A), the information providing mode (reference symbol 46B), or the operating mode (reference symbol 46C) based on the user's action.

Figure 12C:
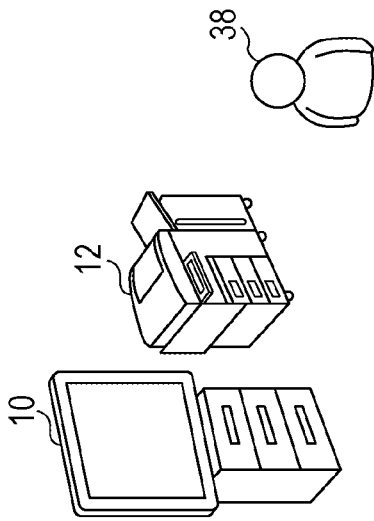
Figure 12B:
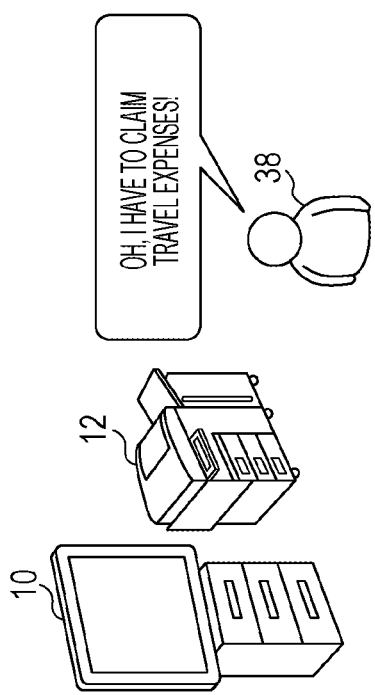

FIG. 12B illustrates a situation corresponding to the positional relationship illustrated in FIG. 13B. When the action β is detected as the action of the user 38 in this situation, the information providing part 28 executes the conversation mode (reference symbol 46A) as a mode corresponding to the positional relationship and the action β. That is, when it is detected that the user has executed an action of turning the line of sight to the UI apparatus 10 (action β), the information providing part 28 executes the conversation mode based on the detection result. At this time, the information providing part 28 identifies the user 38 by acquiring information on the user 38 (user information). For example, the information providing part 28 acquires schedule information or organization information of the user 38. In the example illustrated in FIG. 12B, the user 38 requests the claim on travel expenses by audio input and information indicating the request is input to the UI apparatus 10. The user 38 may input the request to the UI apparatus 10 by operating the screen of the UI part 18. When the information providing part 28 has received the request for the claim on travel expenses from the user 38, the information providing part 28 checks the presence or absence of travels of the user 38 by referring to the schedule information of the user 38. For example, when information indicating a travel whose travel expenses have not been claimed yet (for example, information indicating a travel to "New York") is registered in the schedule information, the information providing part 28 provides information related to the travel. The information providing part 28 may provide the information related to the travel as audio information or may display the information on the display part of the UI part 18. In the example illustrated in FIG. 12B, the information related to the travel is provided to the user 38 by sound.

When the user 38 has requested, by audio input, the claim on travel expenses indicated by the information provided by the information providing part 28 as illustrated in FIG. 12C, the UI apparatus 10 submits a reimbursement claim on travel expenses. When the user 38 has requested another claim on travel expenses by audio input (for example, a claim on travel expenses of a travel to "Boston"), the UI apparatus 10 submits a reimbursement claim on the travel expenses together. The user 38 may request the UI apparatus 10 for the claim on travel expenses by operating the screen of the UI part 18.

The UI apparatus 10 may control the image forming device (device 12) to print an application form. In this case, for example, the UI apparatus 10 may control the image forming device (device 12) to print an application form when the user has moved to a position in front of the image forming device as illustrated in FIG. 13C and the UI apparatus 10 has detected the movement. When a signature is required, the information providing part 28 may provide information indicating that a signature is required.

Figure 12D:
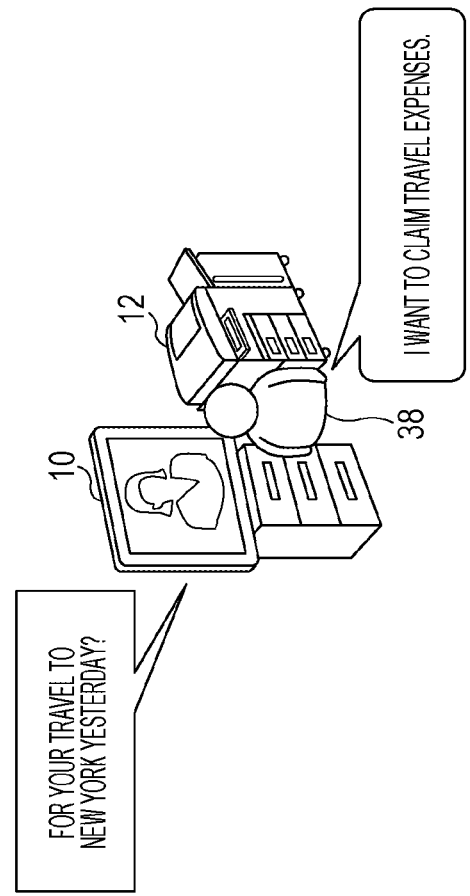

When the user 38 has moved away from the UI apparatus 10 and the image forming device (device 12) to the outside of the second area 42 as illustrated in FIG. 12D, the positional relationship corresponds to the positional relationship (a1) in FIG. 8. Therefore, the information providing part 28 executes the public providing mode (reference symbol 44A).

Specific Example 3

Specific Example 3 is described with reference to FIGS. 14A to 15B. FIGS. 14A to 14D illustrate details of the operation of the UI apparatus 10 and the like in Specific Example 3. FIGS. 15A and 15B illustrate positional relationships in Specific Example 3. For example, the device 12 is the image forming device.

In Specific Example 3, an error has occurred in the image forming device (device 12). Specifically, there has occurred such an error that paper (for example, letter-size paper) is not contained in the image forming device. In this case, the information providing part 28 provides information indicating that the error has occurred in the image forming device by executing the conversation mode irrespective of the positional relationship and the details of the user's action. For example, the information providing part 28 provides the error information even if the user 38 is located outside the second area 42 as illustrated in FIG. 15A (even if the positional relationship corresponds to the positional relationship (a1) in FIG. 8). In the example illustrated in FIG. 14A, the information providing part 28 provides the error information by sound. For example, the error information is provided by sound indicating a message "LETTER-SIZE PAPER HAS RUN OUT. PLEASE REFILL THE TRAY WITH PAPER." The information providing part 28 may display the error information on the display part of the UI part 18 together with or without using sound.

When the user 38 has moved to a position in front of the image forming device (device 12) to enter the second area 42 as illustrated in FIG. 15B, the information providing part 28 executes the conversation mode to provide information indicating further details of the error or work necessary to correct the error. That is, when the user 38 is located outside the second area 42, the information providing part 28 executes the conversation mode to provide the error information for the purpose of notifying the user 38 that the error has occurred in the image forming device (device 12). When the user 38 has moved to a position near the image forming device (device 12) (for example, in front of the image forming device), it is predicted that the possibility of work for error correction by the user 38 is higher than in the case in which the user 38 is located outside the second area 42. Therefore, when the user 38 has moved to a position in front of the image forming device, the information providing part 28 provides the information indicating further details of the error or work necessary to correct the error compared with the case in which the user 38 is located outside the second area 42. FIG. 14B illustrates the situation at that time. For example, the information providing part 28 outputs a paper replenishing procedure by sound. The information providing part 28 may display information indicating the procedure (for example, an image or a character string) on the display part of the UI part 18. The information providing part 28 may provide the information indicating further details of the error or necessary work when the user has inquired details of the error from the UI apparatus 10. In the example illustrated in FIG. 14B, the user inquires the tray that has run out of paper and the information providing part 28 provides information indicating the tray to be replenished with paper as a response to the inquiry.

The control part 26 of the UI apparatus 10 may detect, for example, a portion or function having a possibility of occurrence of an error in the device 12 (for example, the image forming device). For example, when the remaining amount of a consumable item contained in the device 12 becomes equal to or lower than a threshold, the control part 26 may determine that an error may occur. When a portion or function having a possibility of occurrence of an error is detected (for example, when the remaining amount of a consumable item becomes equal to or lower than a threshold), the information providing part 28 may provide information indicating that a portion or function having a possibility of occurrence of an error is detected and information indicating work necessary to avoid the occurrence of an error.

Figure 14A:
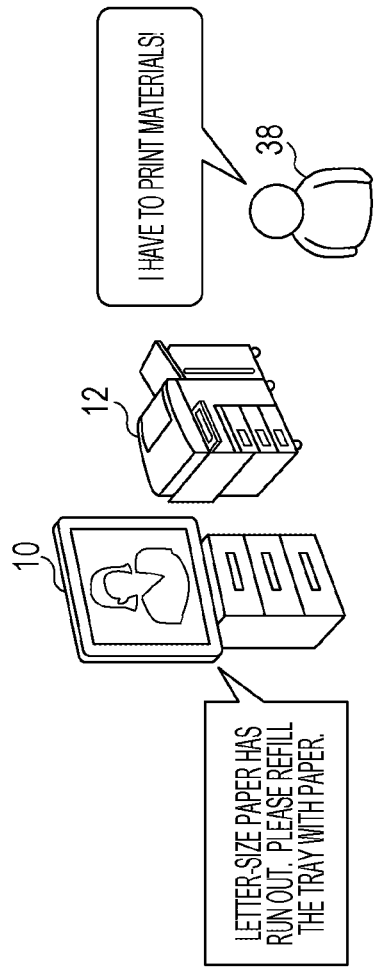
FIGS. 14A to 14D illustrate Specific Example 3.
Figure 14C:
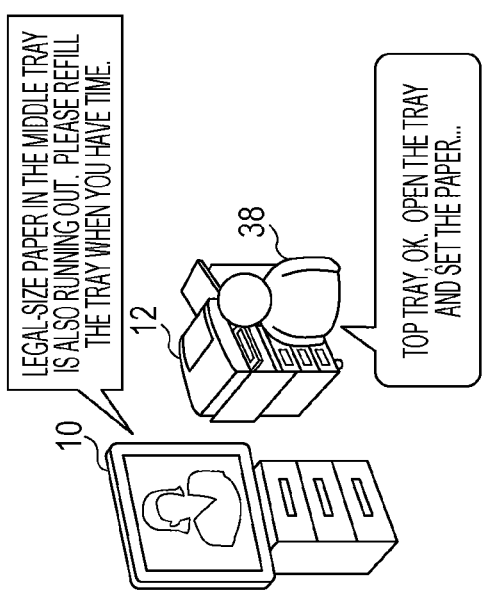
Figure 14B:
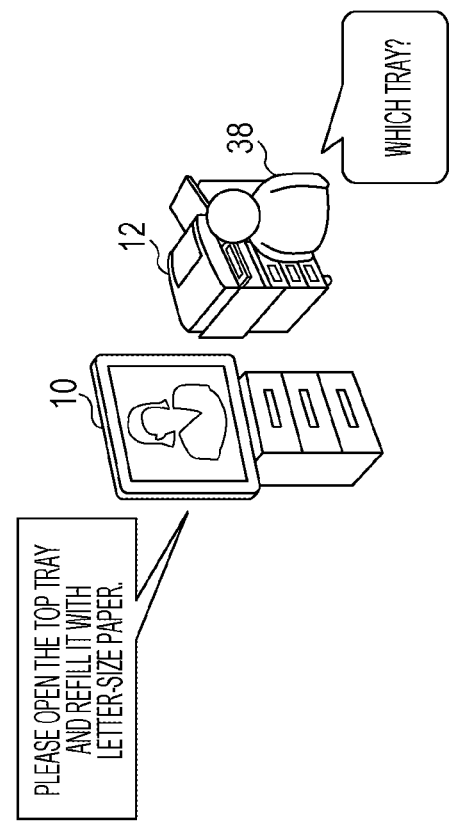
Figure 15A:
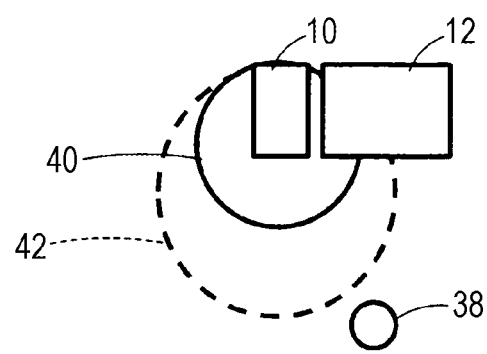
FIGS. 15A and 15B illustrate positional relationships in Specific Example 3.
Figure 15B:
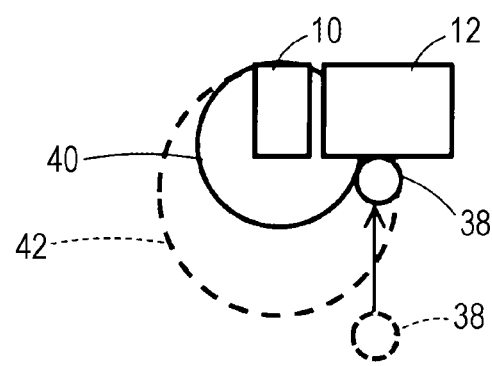

For example, when the remaining number of sheets of legal-size paper is equal to or lower than a threshold, the information providing part 28 may propose replenishment of legal-size paper to the user 38 as illustrated in FIG. 14C.

Figure 14D:
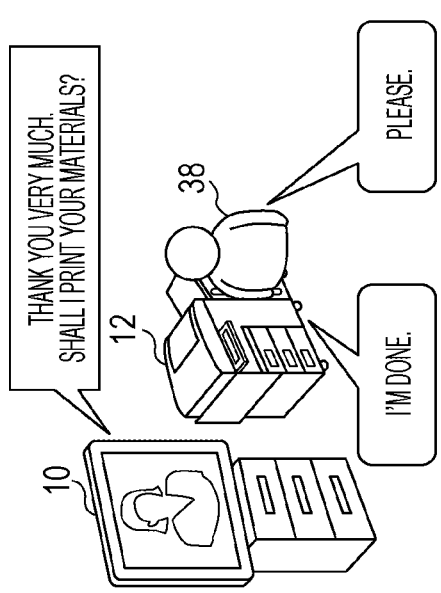

FIG. 14D illustrates a situation after the error has been corrected (after paper has been replenished). Similarly to Specific Examples 1 and 2, when the user 38 is identified and gives a print instruction by voice or by screen input, the image forming device executes printing intended by the user 38.

When an error has occurred in the image forming device (device 12) but details of the error do not affect the user's request, the UI apparatus 10 may cause the image forming device to execute processing in response to the user's request. For example, when the processing indicated by the user's request is scanning processing, paper is not necessary and therefore the UI apparatus 10 causes the image forming device to execute the scanning processing. The UI apparatus 10 may propose, to the user 38, a different device (for example, an image forming device) having no error.

Specific Example 4

Figure 17A:
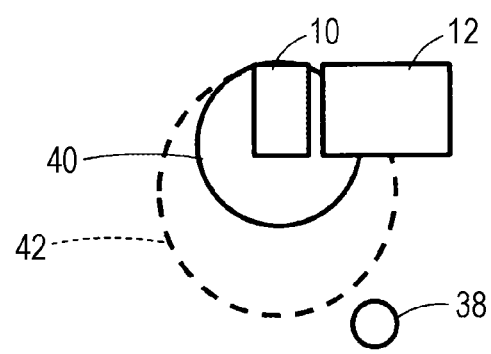
FIGS. 17A and 17B illustrate positional relationships in Specific Example 4.
Figure 17B:
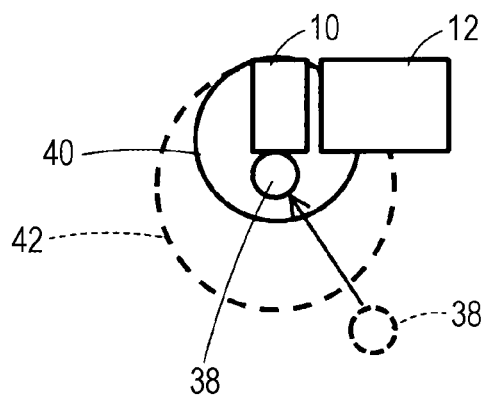

Specific Example 4 is described with reference to FIGS. 16A to 17B. FIGS. 16A to 16D illustrate details of the operation of the UI apparatus 10 and the like in Specific Example 4. FIGS. 17A and 17B illustrate positional relationships in Specific Example 4. For example, the device 12 is the image forming device.

For example, when the user 38 is located outside the second area 42 as illustrated in FIG. 17A (when the positional relationship corresponds to the positional relationship (a1) in FIG. 8), the information providing part 28 executes the public providing mode (reference symbol 44A) irrespective of the user's action. The user 38 intends to print sales materials.

When the user 38 has moved to a position in front of the UI apparatus 10 to enter the first area 40 as illustrated in FIG. 17B, the positional relationship corresponds to the positional relationship (a3) in FIG. 8. Therefore, the information providing part 28 executes the conversation mode (reference symbol 46A), the information providing mode (reference symbol 46B), or the operating mode (reference symbol 46C) based on the user's action.

FIG. 16A illustrates a situation corresponding to the positional relationship illustrated in FIG. 17B. When the action β is detected as the action of the user 38 in this situation, the information providing part 28 executes the conversation mode (reference symbol 46A) as a mode corresponding to the positional relationship and the action β. That is, when it is detected that the user has executed an action of turning the line of sight to the UI apparatus 10 (action β), the information providing part 28 executes the conversation mode based on the detection result. At this time, the information providing part 28 identifies the user 38 by acquiring information on the user 38 (user information). For example, the information providing part 28 acquires schedule information, organization information, or information on years of employment of the user 38.

In the example illustrated in FIG. 16A, the user 38 requests creation of sales materials by audio input and information indicating the request is input to the UI apparatus 10. The user 38 may input the request to the UI apparatus 10 by operating the screen of the UI part 18. When the information providing part 28 has received the request for the creation of sales materials from the user 38, the information providing part 28 acquires information related to the materials from a different apparatus (for example, an in-house server, a different device, or the Internet) and creates sales materials unique to the user 38 based on the acquired materials. For example, the information providing part 28 determines the volume and quality of sales materials based on a history of employment of the user 38 or a record of accomplishments in the company (those pieces of information are acquired as user information) and creates sales materials having the determined volume and quality. For example, when a value indicating the years of employment of the user 38 is equal to or lower than a threshold, the information providing part 28 creates sales materials having a larger volume than in a case in which the value indicating the years of employment is higher than the threshold. When the value indicating the years of employment is higher than the threshold, the information providing part 28 creates more concise sales materials. The information providing part 28 may determine the volume and quality of sales materials based on a use history of the user 38. For example, when there is such a history that the user 38 has ever created sales materials having a large volume, the information providing part 28 creates sales materials having a larger volume based on the history. When there is such a history that the user 38 has ever created concise sales materials, the information providing part 28 creates concise sales materials based on the history. The information providing part 28 may determine the volume and quality of sales materials based on the job title or authority of the user 38. For example, the information providing part 28 may create more concise sales materials as the job title or authority of the user 38 is a higher grade. Thus, the user 38 is identified and information unique to the user 38 is provided.

The information providing part 28 provides the sales materials to the user 38. For example, the information providing part 28 displays the sales materials on the display part of the UI part 18 as illustrated in FIG. 16B. At this time, the information providing part 28 may switch the operation mode from the conversation mode to the operating mode or may execute both of the conversation mode and the operating mode. In the operating mode, the user 38 is allowed to edit the sales materials created by the information providing part 28. In the example illustrated in FIG. 16B, both of the conversation mode and the operating mode are executed.

When the action γ is detected as the action of the user 38, the information providing part 28 executes the operating mode as illustrated in FIG. 16C. That is, the positional relationship corresponds to the positional relationship (a3) in FIG. 8 and the action of the user 38 corresponds to the action γ. Therefore, the operation mode is switched to the operating mode. In the operating mode, the user 38 is allowed to edit the sales materials created by the information providing part 28 and to give an instruction to output the sales materials.

When the user 38 has instructed the UI apparatus 10 to print the sales materials by audio input or by operating the screen, the UI apparatus 10 causes the image forming device (device 12) to print the sales materials in accordance with the instruction. At this time, the information providing part 28 may output a message about execution of printing by sound as illustrated in FIG. 16D or may display the message on the screen of the UI part 18.

The information providing part 28 may provide supplementary information to the user 38. For example, the information providing part 28 may acquire, as the supplementary information, information indicating a map showing the route to the sales destination of the user 38 and cause the image forming device to print the map. The information providing part 28 may identify the sales destination based on the schedule of the user 38 or the conversation with the user 38. The information providing part 28 may determine whether to provide the supplementary information based on the years of employment, the job title, the authority, or the like of the user 38. For example, the information providing part 28 may provide the supplementary information when the value indicating the years of employment is equal to or lower than the threshold or when the grade of the job title or authority is equal to or lower than that of a predetermined job title or authority. The information providing part 28 need not provide the supplementary information in other cases. The information providing part 28 may determine whether to provide the supplementary information based on a sales history of the user 38. For example, the information providing part 28 may provide the supplementary information when the user 38 has not ever visited the sales destination. The information providing part 28 need not provide the supplementary information in other cases. Information indicating the sales history is acquired as user information.

The information providing part 28 may store data on the sales materials created by the instruction from the user 38 in a storage area (for example, a storage device provided in an in-house server). The information providing part 28 may associate attribute information of the user (for example, information indicating sales materials for inexperienced employees, for experienced employees, or for managers or higher-grade titles) with the data on the sales materials. In this manner, materials that are once created may be used for other purposes.

According to the exemplary embodiment described above, the operation mode is executed based on the positional relationship among the user, the UI apparatus 10, and the device 12, the user's action, the state of the device 12, and the like and the independent information or the dependent information is provided to the user. Thus, information is provided to the user in response to the user's request.

In the exemplary embodiment described above, a single device 12 is included in the device system but plural devices 12 may be included in the device system. When plural devices 12 are included in the device system, the areas described above (first area 40 and second area 42) may be defined for each individual device 12 and the UI apparatus 10 may execute the operation mode for each individual device 12 based on a positional relationship between the user and the areas. For example, the first area 40 and the second area 42 are defined for a first device and the first area 40 and the second area 42 are defined for a second device. The information providing part 28 executes the public providing mode or an on-demand providing mode related to the first device based on the positional relationship between the areas defined for the first device and the user and based on the user's action. Similarly, the information providing part 28 executes the public providing mode or an on-demand providing mode related to the second device based on the positional relationship between the areas defined for the second device and the user and based on the user's action. The information providing part 28 may execute the operation mode based also on the state of the first device or may execute the operation mode based also on the state of the second device.

Each of the UI apparatus 10, the device 12, and the terminal apparatus 14 is implemented by, for example, cooperation between hardware and software. Specifically, each of the UI apparatus 10, the device 12, and the terminal apparatus 14 includes one or plural processors such as CPUs (not illustrated). The one or plural processors read and execute a program stored in a storage device (not illustrated), thereby implementing the functions of the respective parts of each of the UI apparatus 10, the device 12, and the terminal apparatus 14. The program is stored in the storage device via a recording medium such as a CD or a DVD or via a communication path such as a network. As another example, the respective parts of each of the UI apparatus 10, the device 12, and the terminal apparatus 14 may be implemented by hardware resources such as a processor, an electronic circuit, or an application specific integrated circuit (ASIC). A device such as a memory may be used for the implementation. As still another example, the respective parts of each of the UI apparatus 10, the device 12, and the terminal apparatus 14 may be implemented by a digital signal processor (DSP) or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
at least one hardware processor configured to implement:
an acquirer that acquires information indicating a request from a user and an approach of the user; and
a controller that causes, in response to the request and the approach, a provider to provide first information that does not depend on a device or second information that depends on the device,
wherein the approach comprises the user coming positionally closer to the information processing apparatus as the user makes the request,
wherein, as processing in response to the request, the controller controls provision of the first information or the second information based on a positional relationship among the user, the device, and the provider,
wherein the controller changes contents of the second information based on the positional relationship and an action of the user,
wherein the controller controls, based on the positional relationship and the action of the user, execution of a first mode for holding a conversation with the user, a second mode for providing information related to the user, or a third mode for providing information related to an operation for the device as a mode for providing the second information,
wherein the controller controls the execution of the first mode, the second mode, or the third mode based on the positional relationship, the action of the user, and a state of the device,
wherein the controller controls the execution of the first mode when the state of the device corresponds to an error state,
wherein the controller controls, as the execution of the first mode, provision of information related to a different device that meets the request, and
wherein the controller preferentially provides the information related to the different device when the different device is located closer to a position of the user.

2. The information processing apparatus according to claim 1,
wherein the first information is information that is not unique to the user, and
wherein the second information is information unique to the user.

3. The information processing apparatus according to claim 2, wherein the request is presumed based on a position of the user.

4. The information processing apparatus according to claim 1,
wherein a plurality of areas are defined based on a position of at least one of the device and the provider, and
wherein the controller controls the provision of the first information or the second information based on a positional relationship between the user and each of the areas.

5. The information processing apparatus according to claim 1, wherein the controller changes contents of the second information based on the positional relationship.

6. The information processing apparatus according to claim 5,
wherein a plurality of areas are defined based on a position of at least one of the device and the provider, and wherein the controller changes the contents of the second information based on a positional relationship between the user and each of the areas.

7. The information processing apparatus according to claim 5, wherein the controller controls, based on the positional relationship, execution of a first mode for holding a conversation with the user, a second mode for providing information related to the user, or a third mode for providing information related to an operation for the device as a mode for providing the second information.

8. The information processing apparatus according to claim 1, wherein the controller controls the execution of the second mode or the third mode based on the action of the user when the state of the device corresponds to an error state.

9. The information processing apparatus according to claim 1,
wherein the provider is a user interface having at least one of a display function and an audio output function, and
wherein each of the first information and the second information includes at least one of visual information and audio information.

10. The information processing apparatus according to claim 1, wherein the controller changes how the second information is provided based on a type of the device.

11. The information processing apparatus according to claim 1, wherein the controller changes how the first information and the second information are provided based on a type of the provider.

12. The information processing apparatus according to claim 1, wherein the controller controls provision of information related to a plurality of devices as the second information.

13. The information processing apparatus according to claim 1, wherein the at least one hardware processor is further configured to implement:
determining which side of the information processing apparatus to which the user approached;
determining the request from a verbal request provided by the user; and
providing, in response to analyzing the verbal request and determining which side of the information processing apparatus the user approached, at least one of the first information and the second information depending on the verbal request and which side of the information processing apparatus the user approached.

14. The information processing apparatus according to claim 13, wherein the at least one hardware processor is further configured to implement:
providing, in response to analyzing the verbal request and determining which side of the information processing apparatus the user approached, the first information and the second information by printing the first information and the second information onto a paper.

15. The information processing apparatus according to claim 1,
wherein the controller causes the provider to provide first information or the second information directly in response to the request and the approach.

16. A non-transitory computer readable medium storing a program causing a computer to execute a process comprising:
acquiring information indicating a request from a user and an approach of the user; and
providing, in response to the request and the approach, first information that does not depend on a device or second information that depends on the device,
wherein the approach comprises the user coming positionally closer to the information processing apparatus as the user makes the request,
wherein the process further comprises
controlling, in response to the request, provision of the first information or the second information based on a positional relationship among the user, the device, and the provider,
changing contents of the second information based on the positional relationship and an action of the user,
controlling, based on the positional relationship and the action of the user, execution of a first mode for holding a conversation with the user, a second mode for providing information related to the user, or a third mode for providing information related to an operation for the device as a mode for providing the second information,
controlling the execution of the first mode, the second mode, or the third mode based on the positional relationship, the action of the user, and a state of the device,
controlling the execution of the first mode when the state of the device corresponds to an error state,
controlling, as the execution of the first mode, provision of information related to a different device that meets the request, and
preferentially providing the information related to the different device when the different device is located closer to a position of the user.

\* \* \* \* \*